United States Patent
Elshafie et al.

(10) Patent No.: US 12,526,812 B2
(45) Date of Patent: Jan. 13, 2026

(54) SPS AND multi-PDSCH CONFIGURATION AND DCI FOR MULTIPLE TB CASE

(71) Applicant: QUALCOMM Incorporated, San Diego, CA (US)

(72) Inventors: Ahmed Elshafie, San Diego, CA (US); Ahmed Attia Abotabl, San Diego, CA (US); Marwen Zorgui, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 561 days.

(21) Appl. No.: 18/046,749

(22) Filed: Oct. 14, 2022

(65) Prior Publication Data
US 2024/0129926 A1    Apr. 18, 2024

(51) Int. Cl.
| H04W 72/12 | (2023.01) |
| H04W 72/1273 | (2023.01) |
| H04W 72/23 | (2023.01) |

(52) U.S. Cl.
CPC ....... *H04W 72/23* (2023.01); *H04W 72/1273* (2013.01)

(58) Field of Classification Search
None
See application file for complete search history.

(56) References Cited

U.S. PATENT DOCUMENTS

| 2017/0135114 A1* | 5/2017 | Hwang | H04L 25/0202 |
| 2019/0349130 A1* | 11/2019 | Khoshnevisan | H04L 1/0009 |
| 2022/0140946 A1* | 5/2022 | Chen | H04L 1/1819 370/328 |
| 2023/0032862 A1* | 2/2023 | Khoshnevisan | H04L 5/0064 |
| 2023/0076119 A1* | 3/2023 | Zewail | H04L 1/1819 |
| 2024/0098517 A1* | 3/2024 | Fakoorian | H04W 52/281 |

OTHER PUBLICATIONS

"Rate_splitting_for_MIMO_wireless_networks_a_promising_PHY-layer_strategy_for_LTE_evolution" IEEE Communications Magazine, vol. 54, No. 5, May 2016 (Year: 2016).*

(Continued)

*Primary Examiner* — Hashim S Bhatti
*Assistant Examiner* — Ahmed Saifuddin
(74) *Attorney, Agent, or Firm* — ArentFox Schiff, LLP

(57) ABSTRACT

A user equipment (UE) may receive and decode multiple types of transport blocks. The UE may receive, via the transceiver, a downlink control information (DCI) that indicates at least first transmission parameters for a first type of transport block for the UE and second transmission parameters for a second type of transport block for rate-splitting with a second UE. The UE may receive, via the transceiver, the first type of transport block during a first physical downlink shared channel (PDSCH) occasion based on the first transmission parameters. The UE may receive, via the transceiver, the second type of transport block based on the second transmission parameters and a third type of transport block based on third transmission parameters during a second PDSCH occasion.

23 Claims, 15 Drawing Sheets

(56) References Cited

OTHER PUBLICATIONS

Clerckx B., et al., "Rate Splitting for MIMO Wireless Networks: A Promising PHY-Layer Strategy for LTE Evolution" IEEE Communications Magazine, IEEE Service Center, Piscataway, US, vol. 54, No. 5, May 1, 2016, pp. 98-105, XP011610377, Abstract, p. 98, Left-Hand col. Line 1—p. 104, Right-Hand Column, Line 55.
Dizdar O., et al., "Rate-Splitting Multiple Access: A New Frontier for the PHY Layer of 6G", 2020 IEEE 92nd Vehicular Technology Conference (VTC2020-FALL), Nov. 1, 2020, XP093109242, 8 Pages, p. 1, Left-Hand Column, Line 1—p. 7, Left-Hand Column, Line 11.
International Search Report and Written Opinion—PCT/US2023/074496—ISA/EPO—Dec. 15, 2023.
Mishra A., et al., "Rate-Splitting Multiple Access for 6G—Part I: Principles, Applications and Future Works", IEEE Communications Letters, IEEE Service Center, Piscataway, NJ, US, vol. 26, No. 10, Jul. 16, 2022, pp. 2232-2236, XP011923011, p. 2232, Left-Hand Column, Line 1 —p. 2236, Right-Hand Column, Line 8.

\* cited by examiner

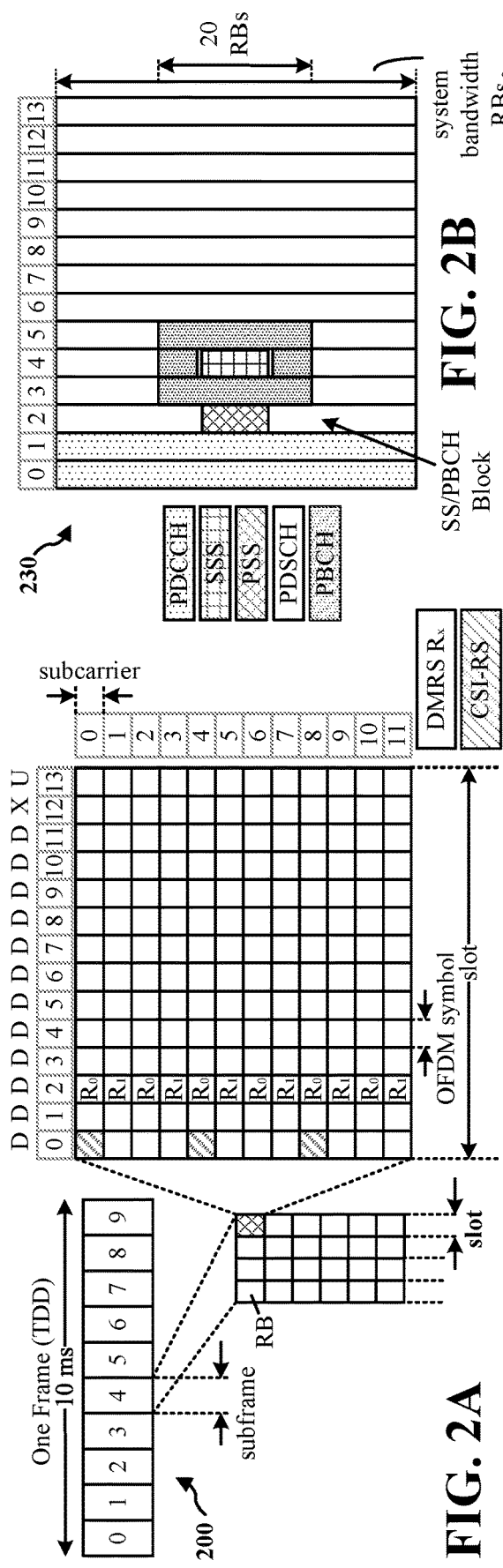
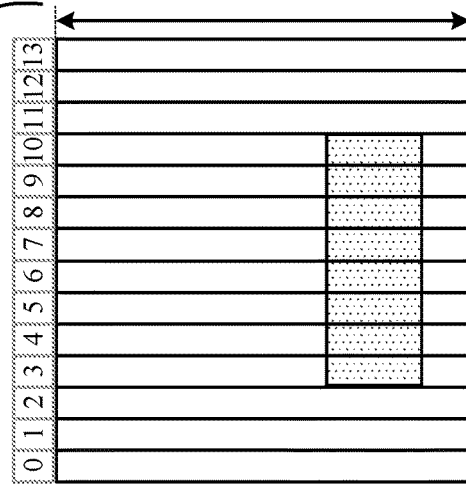
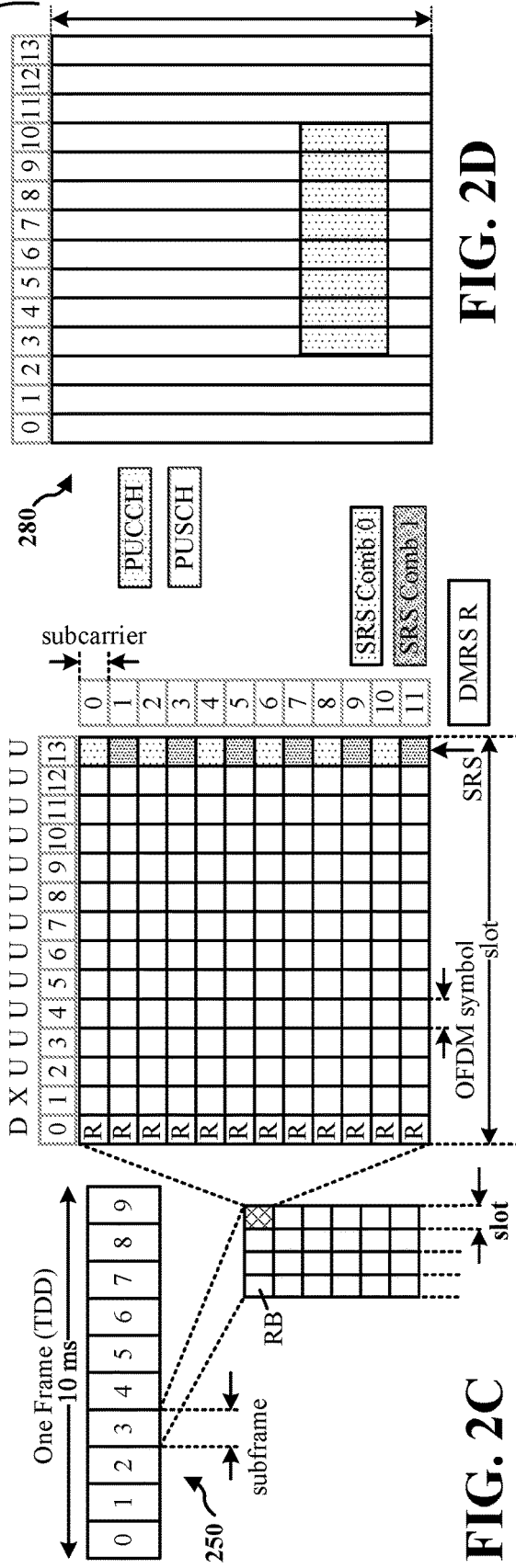
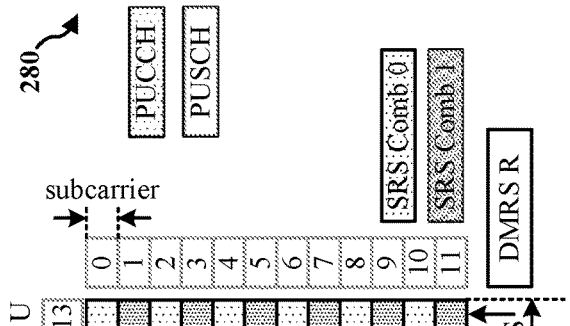
FIG. 2A
FIG. 2B
FIG. 2C
FIG. 2D

SPS AND multi-PDSCH CONFIGURATION AND DCI FOR MULTIPLE TB CASE

TECHNICAL FIELD

The present disclosure relates to wireless communications, and more particularly to semi-persistent scheduling (SPS) or multiple physical downlink shared channel (PDSCH) configuration and downlink control information (DCI) for multiple transport block (TB) cases.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

SUMMARY

The systems, methods and devices of this disclosure each have several innovative aspects, no single one of which is solely responsible for the desirable attributes disclosed herein.

In some aspects, the techniques described herein relate to a method of wireless communication for a user equipment (UE), including receiving a downlink control information (DCI) that indicates at least first transmission parameters for a first type of transport block for the UE and second transmission parameters for a second type of transport block for rate-splitting with a second UE. The method includes receiving the first type of transport block during a first physical downlink shared channel (PDSCH) occasion based on the first transmission parameters. The method includes receiving the second type of transport block based on the second transmission parameters and a third type of transport block based on third transmission parameters during a second PDSCH occasion.

The present disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

One innovative aspect of the subject matter described in this disclosure can be implemented in a method of wireless communication at a base station (BS) including: transmitting a DCI that indicates at least first transmission parameters for a first type of transport block for the UE and second transmission parameters for a second type of transport block for rate-splitting with a second UE. The method includes transmitting the first type of first transport block during a first PDSCH occasion based on the first transmission parameters. The method includes transmitting the second type of transport block based on the second transmission parameters and a third type of transport block based on third transmission parameters during a second PDSCH occasion.

The present disclosure also provides an apparatus (e.g., a BS) including a memory storing computer-executable instructions and at least one processor configured to execute the computer-executable instructions to perform the above method, an apparatus including means for performing the above method, and a non-transitory computer-readable medium storing computer-executable instructions for performing the above method.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 2A is a diagram illustrating an example of a first frame.

FIG. 2B is a diagram illustrating an example of DL channels within a subframe.

FIG. 2C is a diagram illustrating an example of a second frame.

FIG. 2D is a diagram illustrating an example of a subframe.

Like reference numbers and designations in the various drawings indicate like elements.

DETAILED DESCRIPTION

Figure 1:
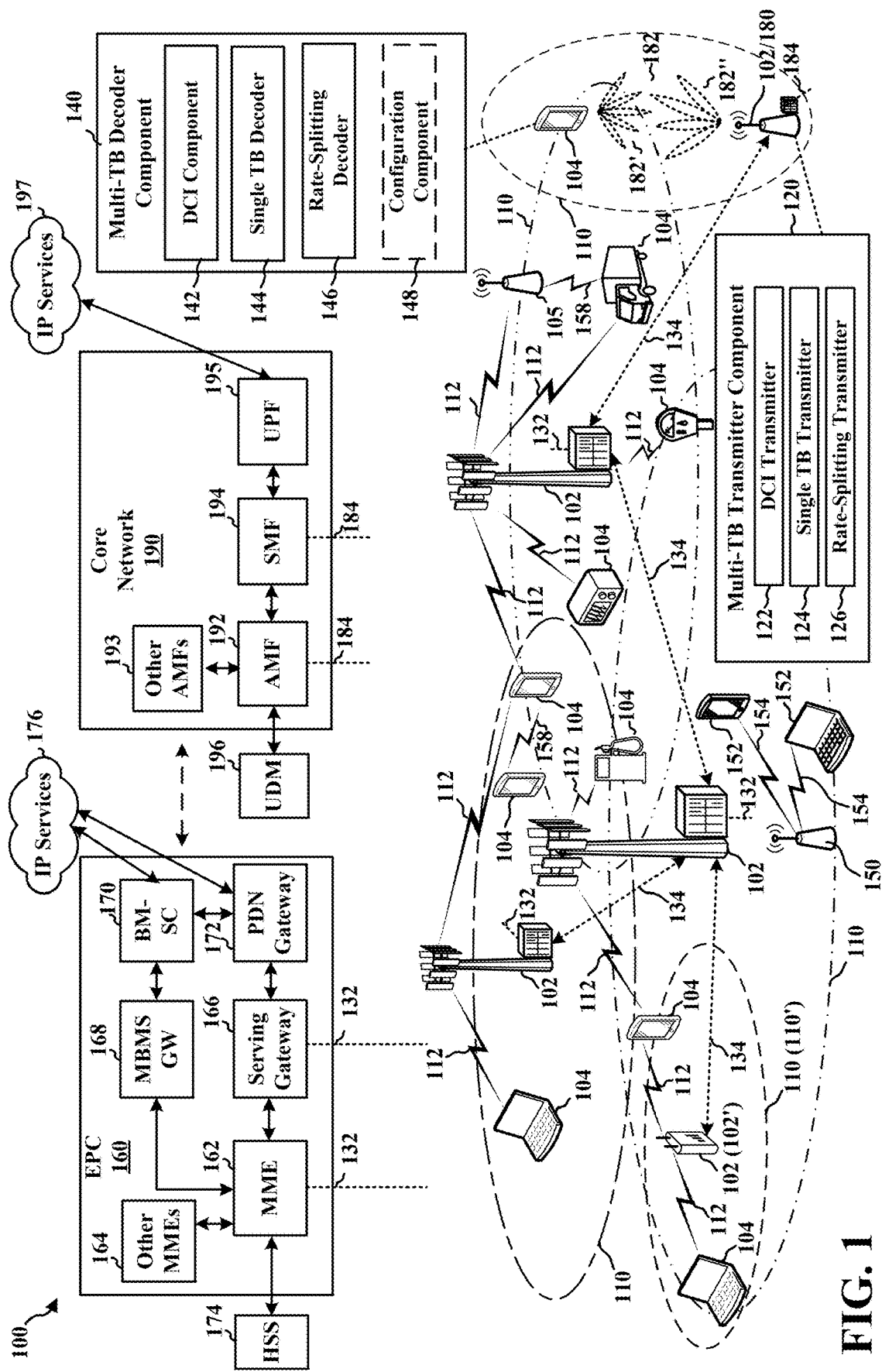
FIG. 1 is a diagram illustrating an example of a wireless communications system and an access network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In wireless communications, data for a particular user is usually encoded as a single message for the user. Academic research has explored the possibility of using rate-splitting techniques to transmit user data over a combination of private messages and common messages. Such techniques may achieve larger degrees of freedom and/or greater capacity. While such gains are theoretically possible, the overhead of signaling for rate-splitting techniques within practical communication networks may reduce the potential gains of rate-splitting. Accordingly, efficient signaling techniques to avoid dramatic increases in signaling overhead for rate-splitting techniques may be desirable.

In an aspect, the present disclosure provides techniques for signaling transmission parameters for multiple PDSCH occasions with potential rate-splitting to a user equipment (UE). For example, the multiple PDSCH occasions may be indicated by a semi-persistent scheduling (SPS) configuration or a multi-PDSCH DCI. Because rate-splitting may be dependent upon other UEs, the signaling may provide transmission parameters for different types of transport blocks such as a dedicated transport block, a private transport block for rate-splitting, and a common transport block for rate-splitting. A downlink control information (DCI) may indicate transmission parameters for at least a first type of transport block and a second type of transport block. In some cases, the transmission parameters for a third type of transport block may be included in the DCI or derived from the other transmission parameters. The UE may receive a dedicated transport block based on the first transmission parameters. The UE may receive a private transport block for rate-splitting and a common transport block for rate-splitting during a PDSCH occasion based on respective transmission parameters. The UE may use a rate-splitting decoding procedure to first decode the common transport block, then decode the private transport block using interference cancelation.

Particular implementations of the subject matter described in this disclosure can be implemented to realize one or more of the following potential advantages. The UE may benefit from increased throughput using rate-splitting without greatly increasing signaling overhead.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. The processor may include an interface or be coupled to an interface that can obtain or output signals. The processor may obtain signals via the interface and output signals via the interface. In some implementations, the interface may be a printed circuit board (PCB) transmission line. In some other implementations, the interface may include a wireless transmitter, a wireless transceiver, or a combination thereof. For example, the interface may include a radio frequency (RF) transceiver which can be implemented to receive or transmit signals, or both. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media excludes transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, relay devices 105, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells. The small cells include femtocells, picocells, and microcells. The base stations 102 can be configured in a Disaggregated RAN (D-RAN) or Open RAN (O-RAN) architecture, where functionality is split between multiple units such as a central unit (CU), one or more distributed units (DUs), or a radio unit (RU). Such architectures may be configured to utilize a protocol stack that is logically split between one or more units (such as one or more CUs and one or more DUs). In some aspects, the CUs may be implemented within an edge RAN node, and in some aspects, one or more DUs may be co-located with a CU, or may be geographically distributed throughout one or multiple RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU). The base stations 102 may be generically referred to as network entities.

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In some implementations, one or more of the UEs 104 may include a multi-TB decoder component 140 configured to decode multiple transport block (TB) types that are scheduled together. The multi-TB decoder component 140 may include a DCI component 140 configured to receive a downlink control information (DCI) that indicates at least first transmission parameters for a first type of transport block for the UE and second transmission parameters for a second type of transport block for rate-splitting with a second UE. The multi-TB decoder component 140 may include a single TB decoder 144 configured receive the first type of first transport block during a first physical downlink shared channel (PDSCH) occasion based on the first transmission parameters. The multi-TB decoder component 140 may include a rate-splitting decoder 146 configured to receive the second type of transport block based on the second transmission parameters and a third type of transport block based on third transmission parameters during a second PDSCH occasion. The multi-TB decoder component 140 may optionally include a configuration component 148 configured to receive the second type of transport block based on the second transmission parameters and a third type of transport block based on third transmission parameters during a second PDSCH occasion.

In some implementations, one or more of the base stations 102 may include a multi-TB transmitter component 120 configured to transmit multiple transport block types that are scheduled together. The multi-TB transmitter component 120 may include a DCI transmitter 122 configured to transmit a DCI that indicates at least first transmission parameters for a first type of transport block for the UE and second transmission parameters for a second type of transport block for rate-splitting with a second UE. The multi-TB transmitter component 120 may include a single TB transmitter 124 configured to transmit the first type of first transport block during a first physical downlink shared channel (PDSCH) occasion based on the first transmission parameters. The multi-TB transmitter component 120 may include a rate-splitting transmitter 126 configured to transmit the second type of transport block based on the second transmission parameters and a third type of transport block based on third transmission parameters during a second PDSCH occasion.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (such as S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over third backhaul links 134 (such as X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 112 between the base stations 102 and the UEs 104 may include UL (also referred to as reverse link) transmissions from a UE 104 to a base station 102 or DL (also referred to as forward link) transmissions from a base station 102 to a UE 104. The communication links 112 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as a MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

FIG. 2A is a diagram 200 illustrating an example of a first frame. FIG. 2B is a diagram 230 illustrating an example of DL channels within a subframe. FIG. 2C is a diagram 250 illustrating an example of a second frame. FIG. 2D is a diagram 280 illustrating an example of a subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. A subset of the total cell bandwidth of a cell is referred to as a Bandwidth Part (BWP) and bandwidth adaptation is achieved by configuring the UE with BWP(s) and telling the UE which of the configured BWPs is currently the active one.

In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure or different channels. A frame (10 milliseconds (ms)) may be divided into 10 equally sized subframes (1 ms). Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 microseconds (μs).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS also may include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIGs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used.

The UE may transmit sounding reference signals (SRS). An SRS resource set configuration may define resources for SRS transmission. For example, as illustrated, an SRS configuration may specify that SRS may be transmitted in the last symbol of a subframe. The SRS may have a comb structure, and a UE may transmit SRS on one comb for each SRS port. The SRS may be used by a base station for channel quality estimation to enable frequency-dependent scheduling on the UL. The SRS may also be used for channel estimation to select a precoder for downlink MIMO.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
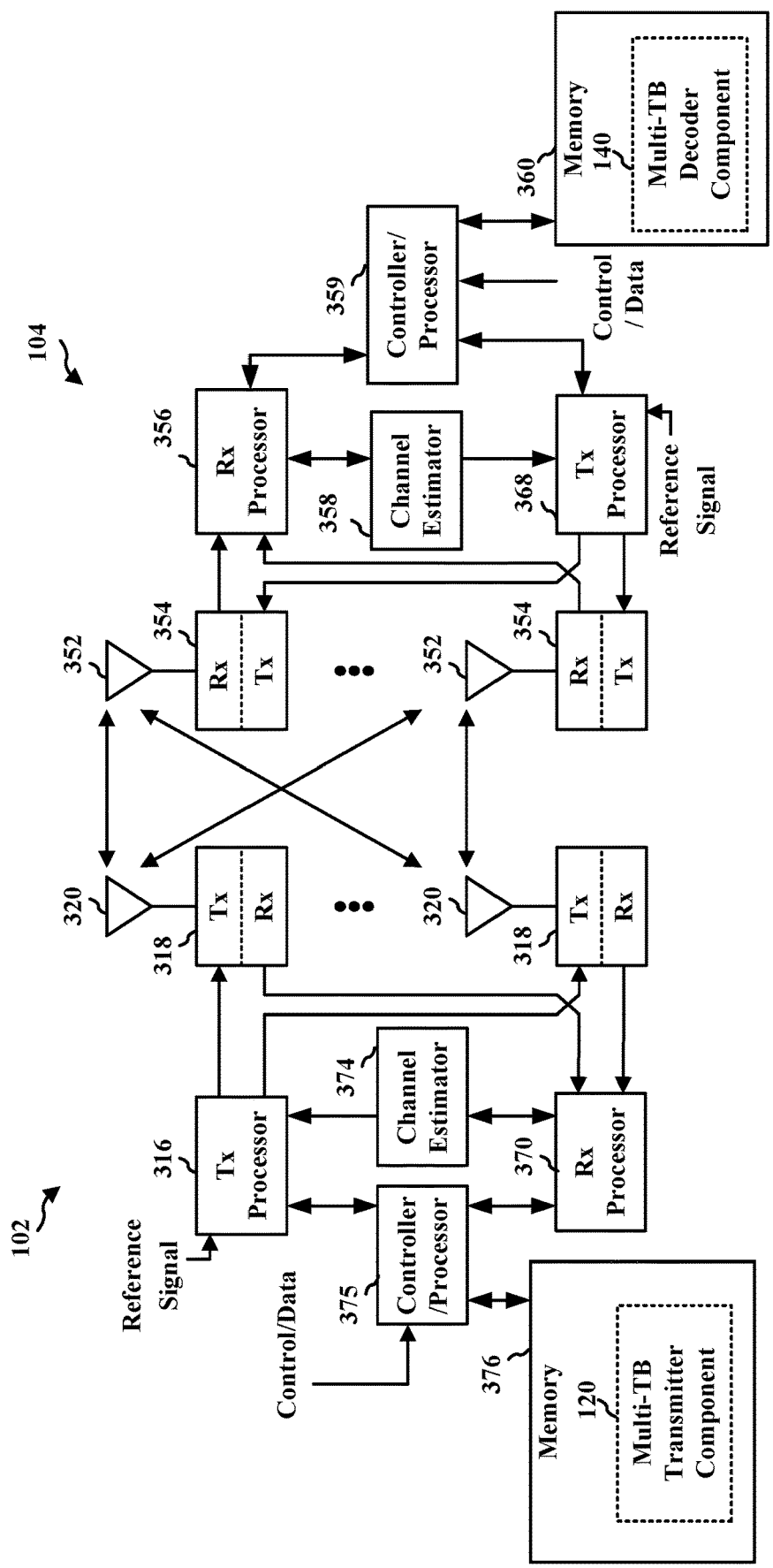
FIG. 3 is a diagram illustrating an example of a base station (BS) and user equipment (UE) in an access network.

FIG. 3 is a diagram of an example of a base station 102 and a UE 104 in an access network. The UE 104 may be an example of a receiving device. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIGs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may be split into parallel streams. Each stream may be mapped to an OFDM subcarrier, multiplexed with a reference signal (such as a pilot) in the time or frequency domain, and combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 104. Each spatial stream may be provided to a different antenna 320 via a separate transmitter 318Tx. Each transmitter 318Tx may modulate an RF carrier with a respective spatial stream for transmission.

At the UE 104, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 104. If multiple spatial streams are destined for the UE 104, they may be combined by the Rx processor 356 into a single OFDM symbol stream. The Rx processor 356 converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 102. These soft decisions may be based on channel estimates computed by the channel estimator 358. The soft decisions are decoded and deinterleaved to recover the data and control signals that were originally transmitted by the base station 102 on the physical channel. The data and control signals are provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 102, the controller/processor 359 provides RRC layer functionality associated with system information (such as MIB, Ms) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 102 in a manner similar to that described in connection with the receiver function at the UE 104. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK or NACK protocol to support HARQ operations.

At least one of the Tx processor 368, the Rx processor 356, and the controller/processor 359 may be configured to cause the UE 104 to perform aspects in connection with the multi-TB decoder component 140 of FIG. 1. For example, the memory 360 may include executable instructions defining the multi-TB decoder component 140. The Tx processor 368, the Rx processor 356, and/or the controller/processor 359 may be configured to execute the multi-TB decoder component 140.

At least one of the Tx processor 316, the Rx processor 370, and the controller/processor 375 may be configured to cause the base station 102 to perform aspects in connection with the multi-TB transmitter component 120 of FIG. 1. For example, the memory 376 may include executable instructions defining the multi-TB transmitter component 120. The Tx processor 316, the Rx processor 370, and/or the controller/processor 375 may be configured to execute the multi-TB transmitter component 120.

Figure 4:
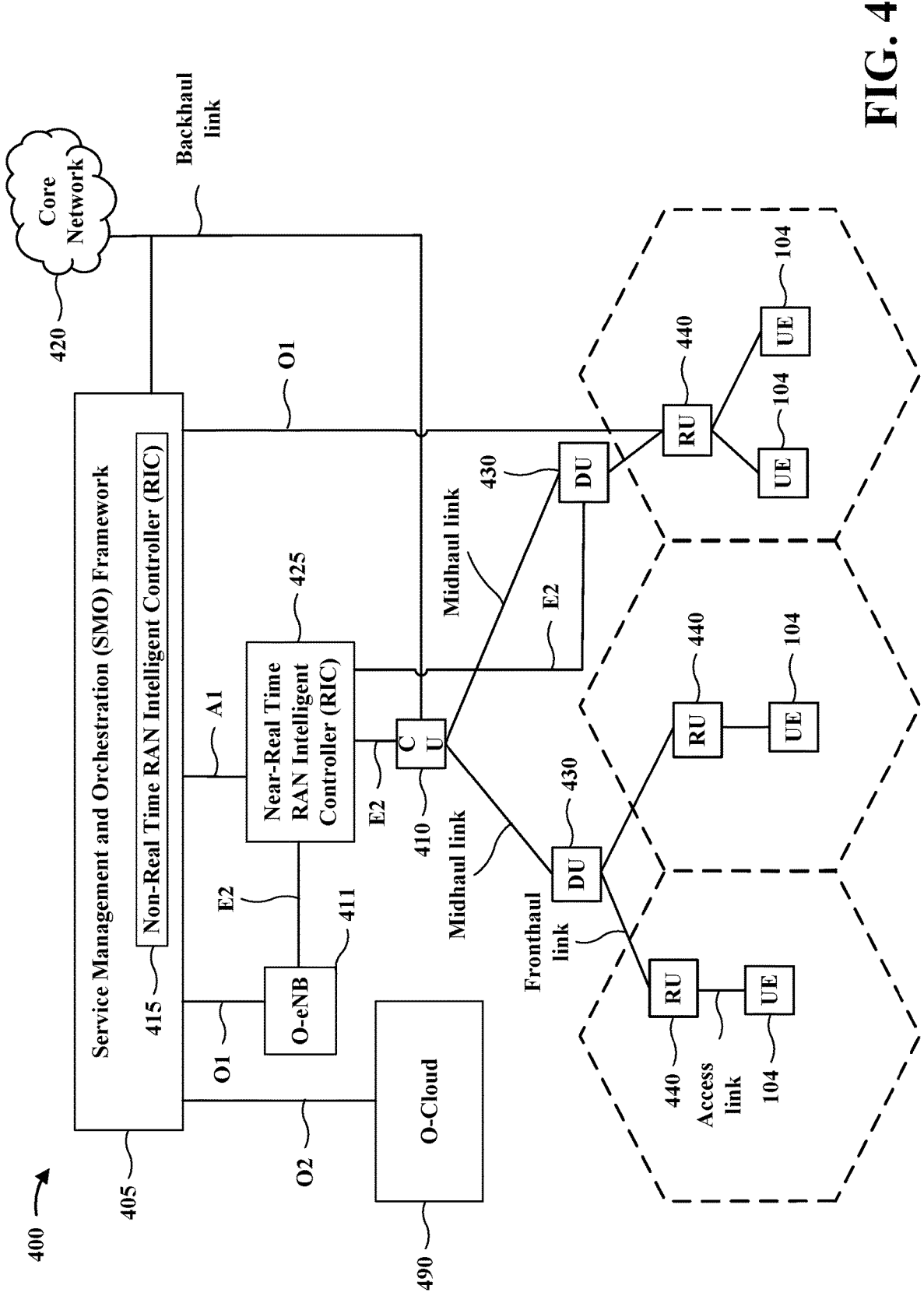
FIG. 4 shows a diagram illustrating an example disaggregated base station architecture.

FIG. 4 shows a diagram illustrating an example disaggregated base station 400 architecture. The disaggregated base station 400 architecture may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (RIC) 425 via an E2 link, or a Non-Real Time (Non-RT) RIC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more radio units (RUs) 440 via respective fronthaul links. The RUs 440 may communicate with respective UEs 104 via one or more radio frequency (RF) access links. In some implementations, the UE 104 may be simultaneously served by multiple RUs 440.

Each of the units, i.e., the CUs 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT MC 415 may monitor long-term trends and patterns for performance and employ AI/ML models to perform corrective actions through the SMO Framework 405 (such as reconfiguration via O1) or via creation of RAN management policies (such as A1 policies).

Figure 5:
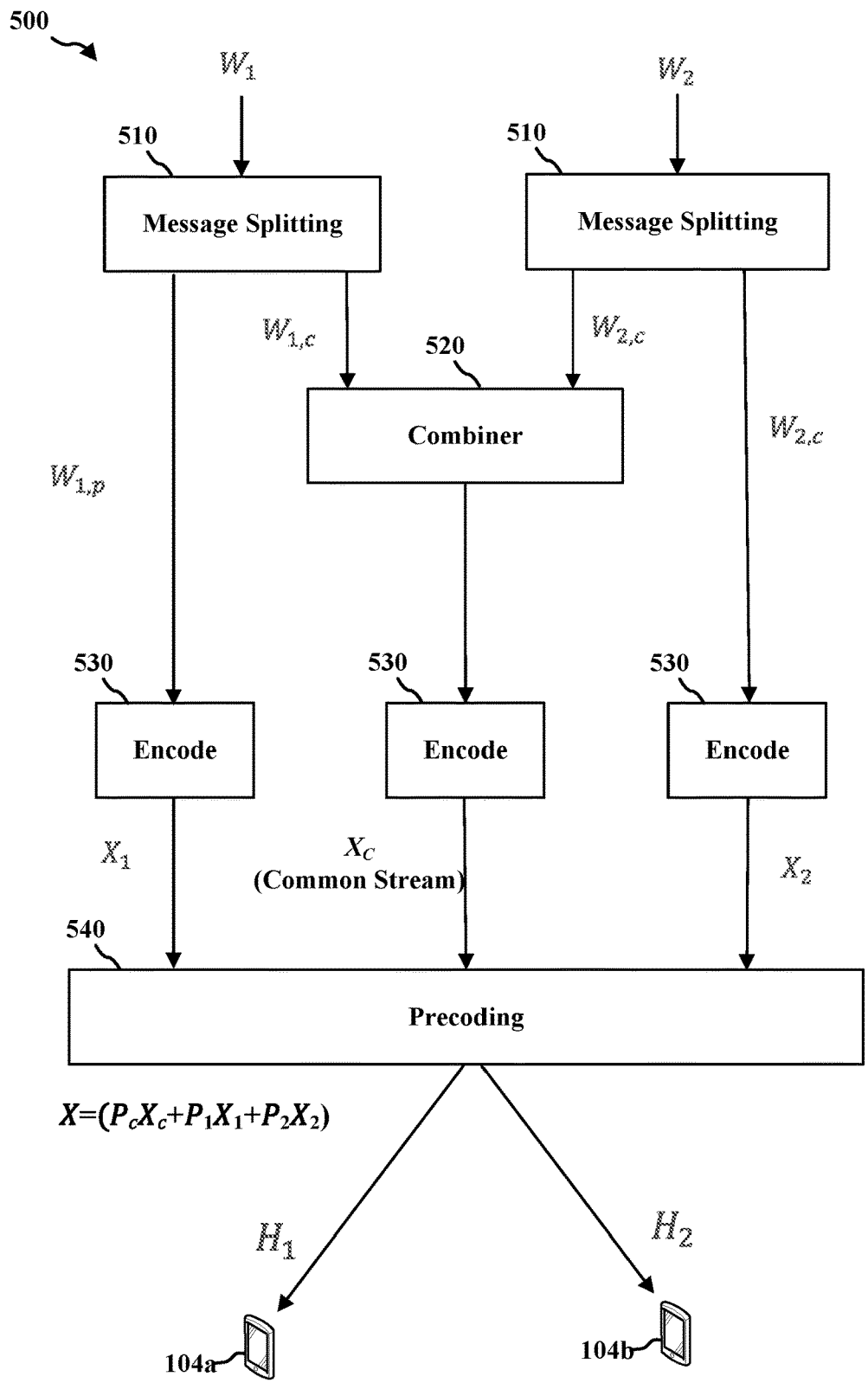
FIG. 5 is a diagram illustrating a transmission procedure for rate-splitting.

FIG. 5 is a diagram illustrating a transmission procedure 500 for rate-splitting. A transmitting device such as the base station 102 may generate a message ($W_1$) for each UE 104 (e.g., UEs 104a and 104b) for transmission. The transmitting device may perform a message splitting operation 510 on each message. The message splitting operation 510 may divide each message into a private message $W_{1,p}$ and a common message $W_{1,c}$. A combiner 520 may concatenate the common messages $W_{1,c}$ and $W_{2,c}$ into a common stream $W_c$. The common stream $W_c$ and each private message (e.g., $W_{1,p}$ and $W_{2,p}$) is provided to an encoder 530. The encoder 530 may perform encoding, modulation, and mapping to one or more layers. The encoders 530 output encoded private streams $X_1$, $X_2$, and encoded public stream $X_c$. At precoding 540, the common stream $X_c$ is encoded by a precoder $P_c$ and transmitted by Tx antennas (from one TRP/gNB or multiple TRPs in a CoMP scenario). The private streams are precoded by $P_1$ and $P_2$, respectively, and transmitted by Tx antennas (from one TRP/gNB or multiple TRPs in CoMP scenario). For example the output transmission may be $X=(P_cX_c+P_1X_1+P_2X_2)$. The output transmission may experience channel conditions and noise. The received signal, for example at UE 104a, may be $Y_1=H_1P_cX_c+H_1P_1X_1+H_1P_2X_2+N_1$.

Figure 6:
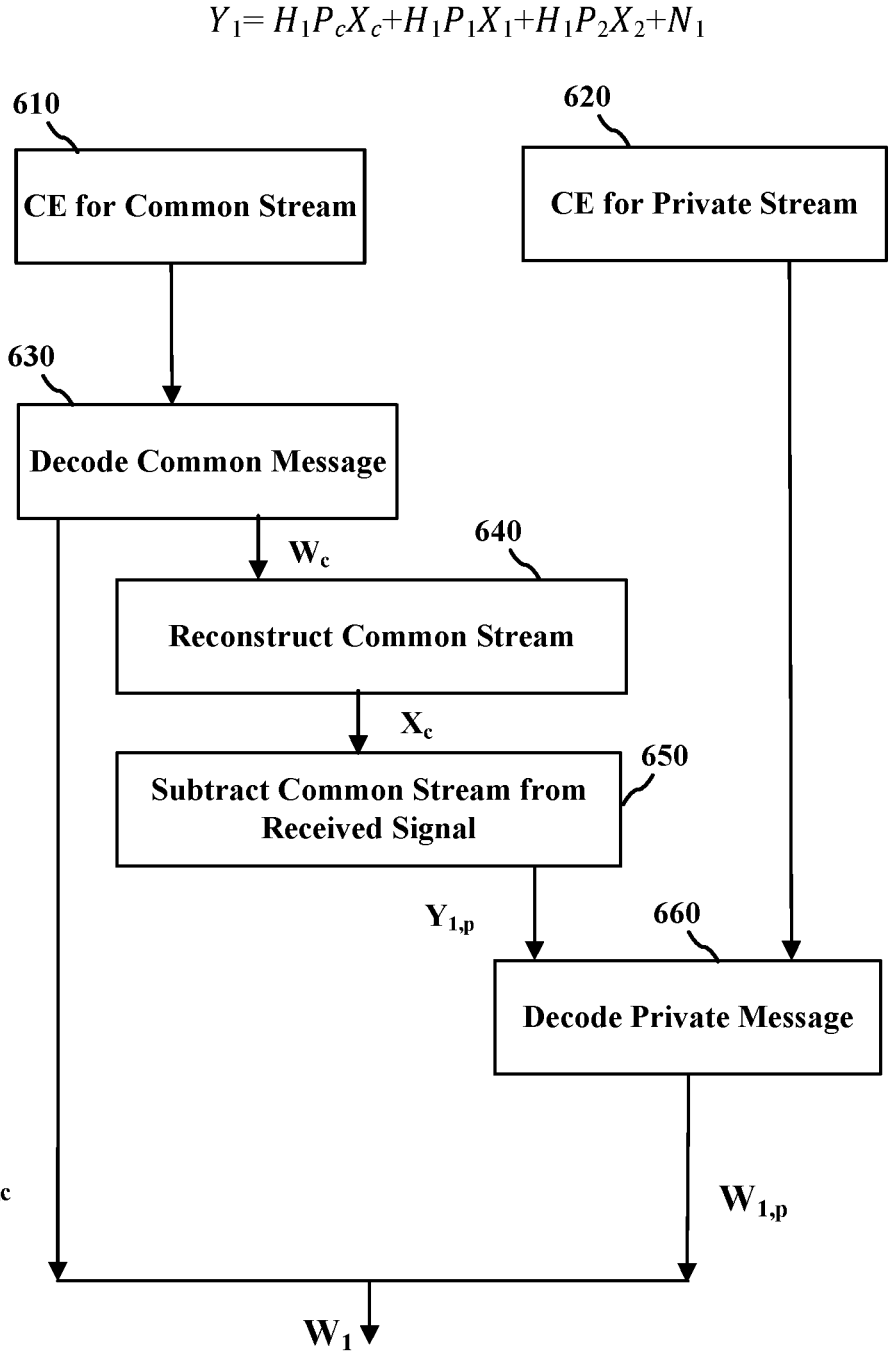
FIG. 6 is a diagram illustrating a reception procedure for rate-splitting.

FIG. 6 is a diagram illustrating a reception procedure 600 for rate-splitting. The UE 104a may receive the signal $Y_1$ and perform a channel estimate 610 for the common stream and a channel estimate 620 for the private stream. At block 630, the UE 104a may decode the common stream to obtain the common message $W_c$. The UE 104a may extract the common message $W_{1,c}$ for the UE 104a from the common message $W_c$. The UE 104a may perform successive interference cancelation at block 640 by reconstructing the common stream $X_c$ from the common message $W_c$ and multiplying by the estimated effective channel. At block 650, the UE 104a may subtract the common stream $X_c$ from the received signal $Y_1$. Assuming perfect channel estimation and successful decoding, $Y_{1,p}=Y_1-H_1P_cX_c=H_1P_1X_1+H_1P_2X_2+N_1$. The UE 104a may then decode the private message $W_{1,p}$ from $Y_{1,p}$. The decoding 660 may include demodulation and demapping as well as decoding. The UE 104a may combine $W_{1,c}$ and $W_{1,p}$ to obtain the original message $W_1$.

Figure 7:
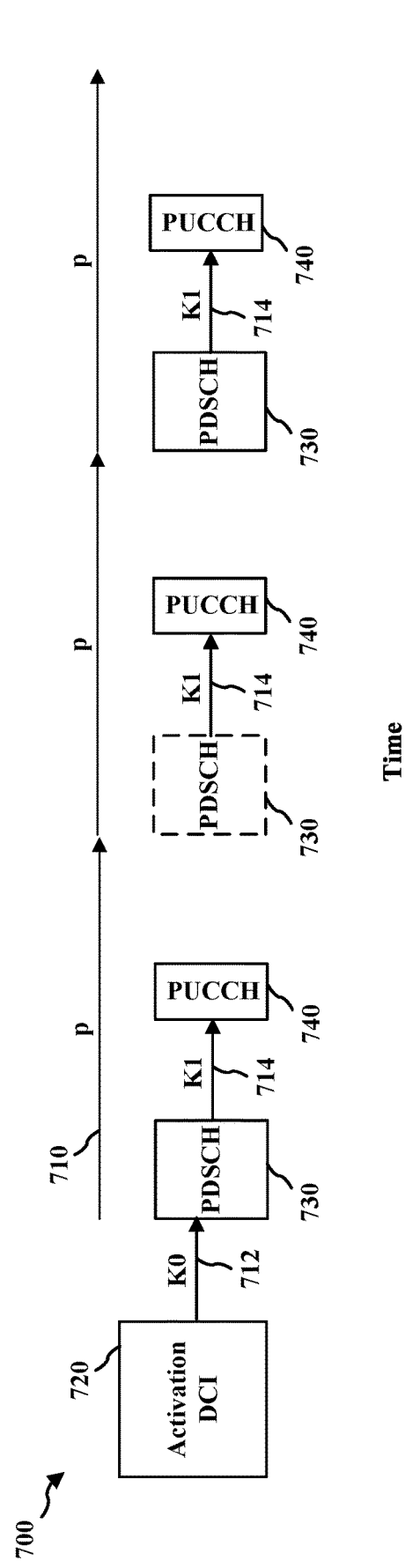
FIG. 7 is a diagram illustrating semi-persistent scheduling.

FIG. 7 is a diagram 700 illustrating semi-persistent scheduling (SPS). A base station 102 may configure a UE 104 with an SPS configuration, for example, via radio resource control (RRC) signaling. The SPS configuration may define SPS parameters such as a periodicity (p) 710, a starting time parameter (K0) 712, and a HARQ feedback timing parameter (K1) 714. The parameter p 710 specifies a time between two SPS PDSCH occasions 730. The parameter K0 712 specifies a period of time between an activation DCI 720 and a first PDSCH occasion 730. The parameter K1 714 specifies a PUCCH time slot 740 on which to transmit a HARQ-ACK after receiving a PDSCH. A UE may be configured with multiple SPS configurations. The base station 102 may activate an SPS configuration by transmitting the activation DCI 720. In some implementations, the activation DCI 720 may be a format 1_1 DCI scrambled with a configured scheduling (CS) radio network temporary identifier (RNTI). The activation DCI 720 may carry additional transmission parameters for receiving a TB on a PDSCH occasion 730 defined by the SPS configuration. For example, the DCI 720 may include a time-domain resource allocation (TDRA), a frequency-domain resource allocation (FDRA), a modulation and coding scheme (MCS), and a demodulation reference signal (DMRS) information (e.g., antenna ports). In some cases, the base station 102 may not transmit a TB on the PDSCH occasion 730, and the UE 104 may transmit a HARQ-NACK in the PUCCH time slot 740.

Figure 8:
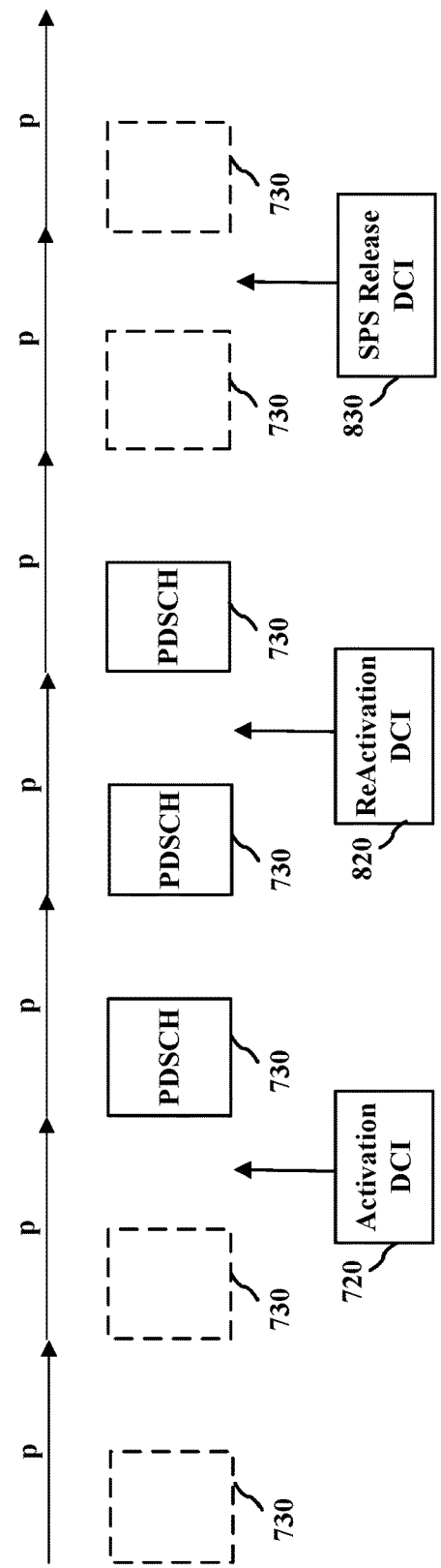
FIG. 8 is a diagram illustrating different transport block types on scheduled physical downlink control channel occasions.

FIG. 8 is a diagram illustrating use of DCIs to change transmission parameters for an SPS configuration. Initially, the SPS configuration may not be active and no PDSCH may be transmitted on the configured PDSCH occasions 730. After the UE 104 receives the activation DCI 720, the UE may receive a TB on each of the configured PDSCH occasions 730. If the base station 102 determines to change transmission parameters, the base station 102 may transmit a reactivation DCI 820 with the new transmission parameters for the SPS configuration. The UE 104 may receive a TB on the PDSCH occasions 730 based on the new transmission parameters. The base station 102 may deactivate the SPS configuration by transmitting an SPS release DCI 830, after which the UE 104 may not receive a TB on the configured PDSCH occasions 830.

In an aspect, SPS may be used to schedule transmissions using rate-splitting techniques. In rate-splitting techniques, however, the different streams for a UE (e.g., $X_1$ and $X_c$) may be encoded or precoded based on different transmission parameters (e.g., MCS and PMI). Accordingly, the SPS may schedule two transport blocks (TBs) for rate-splitting. Further, because transmissions to a first UE 104a may not always align with transmission to a second UE 104b, the SPS scheduling may also schedule a separate TB for regular (e.g., non-rate-splitting) transmissions. That is, SPS for UEs configured for rate-splitting may involve scheduling three or more types of TBs.

Figure 9:
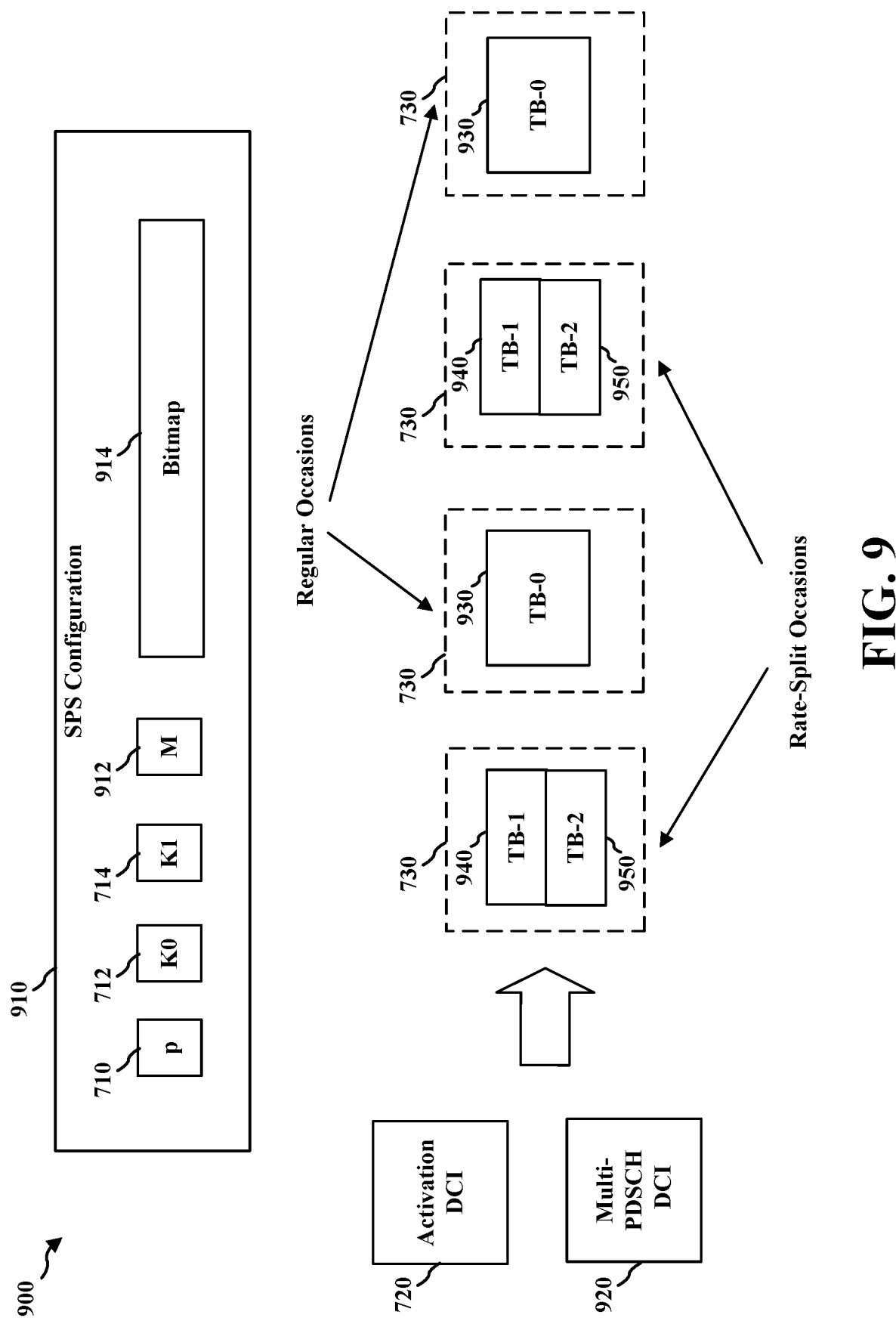
FIG. 9 is a diagram illustrating a two-stage downlink control information for scheduling different transport block types.

FIG. 9 is a diagram 900 illustrating different transport block types on scheduled PDSCH occasions 730. The PDSCH occasions 730 may be scheduled by a SPS configuration 910. The SPS configuration 910 may include the parameters p 710, K0 712, and K1 714 defining the PDSCH occasions 730. The SPS configuration 910 may further include a parameter M 912 that specifies a number of PDSCH occasions in a pattern. The SPS configuration 910 may further include a bitmap 914 of length M, where each bit indicates whether the PDSCH occasions 730 is a regular occasion or a rate-split occasion.

The transmission parameters of the PDSCH occasions 730 may be indicated by, for example, an activation DCI 720 or a multi-PDSCH DCI 910. The PDSCH occasions 730 may include regular occasions and rate-split occasions. On the regular occasions, the UE 104 may receive a first type of TB 930 (e.g., TB-0) according to first transmission parameters. On the rate-split occasions, the UE 104 may receive a second type of TB 940 (e.g., TB-1 for common streams) and a third type of TB 950 (e.g., TB-2 for private streams). The PDSCH occasions 730 for rate-splitting may be associated with two sets of transmission parameters. The activation DCI 720 and/or the multi-PDSCH DCI 910 may need to carry additional information for additional transport blocks. For instance, each transport block may include a set of information indicating MCS, TDRA, FDRA, redundancy version, and DMRS ports. In some implementations, the activation DCI 720 and/or the multi-PDSCH DCI 920 may include the parameter M 912 and/or the bitmap 914.

Figure 10:
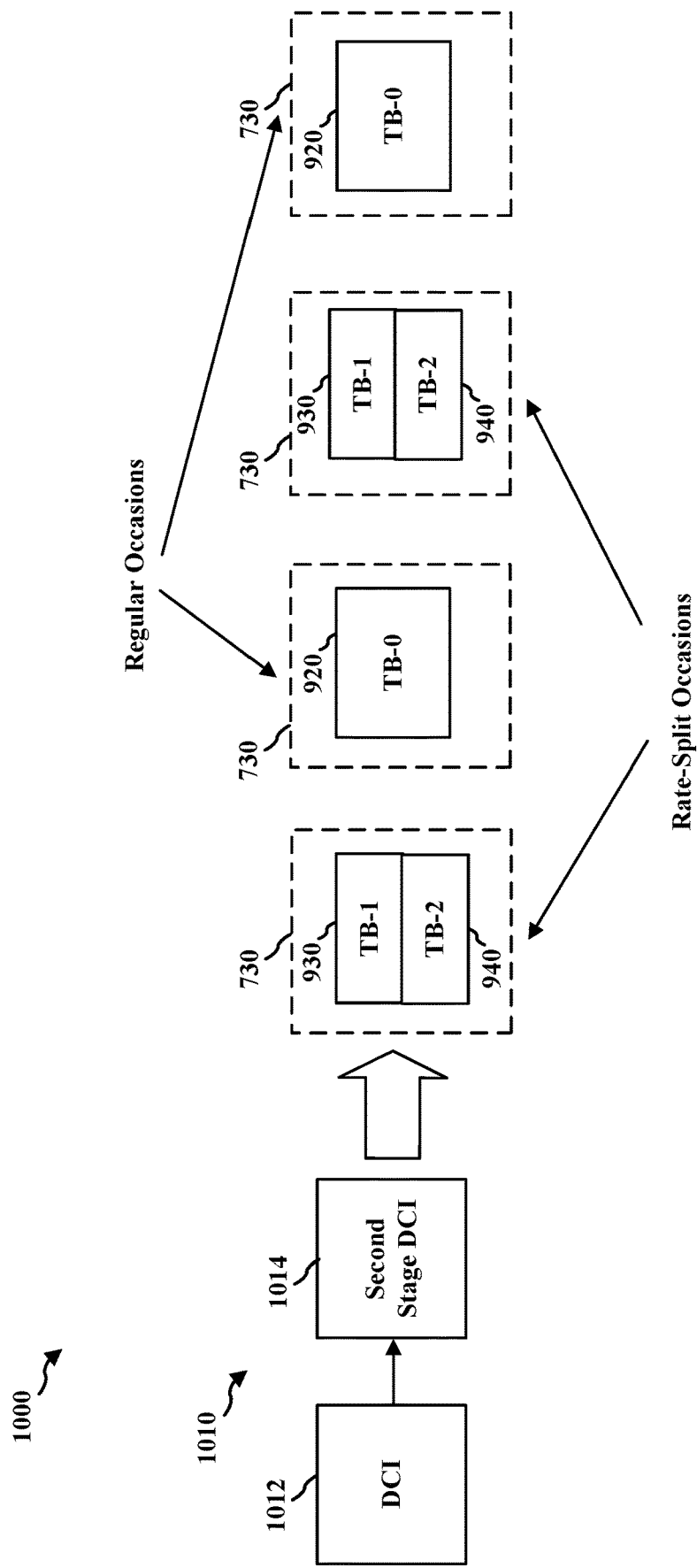
FIG. 10 is a diagram illustrating an example downlink control information for scheduling different transport block types.

FIG. 10 is a diagram 1000 illustrating use of a two-stage DCI 1010 for scheduling different transport block types. The two-stage DCI 1010 may include a first stage DCI 1012 and a second stage DCI 1014. The first stage DCI 1012 may provide transmission parameters for up to two types of TBs. For example, the first stage DCI 1012 may indicate transmission parameters for regular occasions (e.g., TB-0) and common messages (e.g., TB-1). The second stage DCI 1014 may be linked to the first stage DCI 1012. For example, the second stage DCI 1014 may be transmitted on PDCCH resources defined based on the first stage DCI 1012 so that blind decoding is not necessary. The second stage DCI 1014 may provide additional information such as transmission parameters for private messages (e.g., TB-2).

Figure 11:
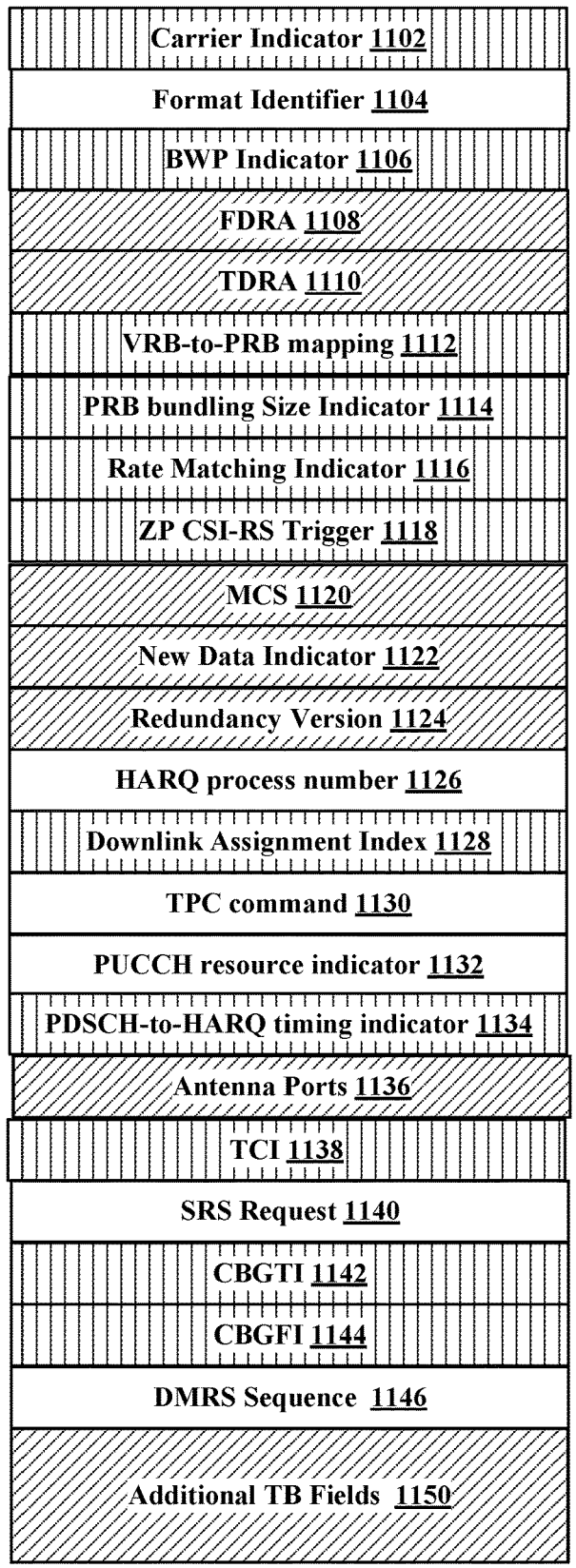
FIG. 11 is a diagram of an example DCI for providing transmission parameters for different transport block types.

FIG. 11 is a diagram illustrating an example DCI 1100 for providing transmission parameters for different transport block types. The DCI 1100 may be based on DCI format 1_1 and may be used for activating an SPS configuration (e.g., an activation DCI 720). In some implementations, DCI format 1_1 may be extended to include the information discussed herein, or a new DCI format may be defined for providing transmission parameters for different transport block types.

The DCI 1100 may include multiple fields such as a carrier indicator field 1102, a format identifier field 1104, a BWP indicator field 1106, a FDRA field 1108, a TDRA field 1110, a VRB-to-PRB mapping field 1112, a PRB bundling size indicator field 1114, a rate matching indicator field 1116, a ZP CSI-RS trigger field 1118, a MCS field 1120, a new data indicator field 1122, a redundancy version field 1124, a HARQ process number field 1126, a downlink assignment index field 1128, a TPC command field 1130, a PUCCH resource indicator field 1132, a PDSCH-to-HARQ timing indicator field 1134, antenna ports field 1136, a TCI field 1138, a SRS request field 1140, a CBGTI field 1142, a CBGFI field 1144, and/or a DRMS sequence field 1146.

In some implementations, some fields (e.g., indicated with a vertical fill pattern) are optional or variable length depending on higher layer configured parameters. In some implementations, some fields are applicable to each type of TB (e.g., indicated with a diagonal fill pattern). The DCI 1100 may include a set of additional TB fields 1150 corresponding to each of the fields that are applicable to each type of TB. For instance, for rate-splitting scenarios with three types of TB, the FDRA field 1108, TDRA field 1110, MCS field 1120, new data indicator field 1122, redundancy version field 1124, and/or antenna ports field 1136 may be repeated in the additional TB fields 1150. In some implementations, different types of TB may utilize the same transmission parameters, or the transmission parameters may be derived from the configured parameters for other types of TB. In such cases, multiple sets of parameters may not be included in the DCI 1100. For instance, the DCI 1100 may have a variable length based on (e.g., an SPS configuration or L1/L2/L3 indication) or the additional TB fields 1150 may be padded with 0s.

In some implementations, regular occasion messages and private messages have different parameters. The DCI 1100 may include fields that are applicable to each type of TB. For example, a first set of the fields may be applicable to TB-0 (e.g., regular occasion messages), a second set of the fields may be applicable to TB-1 (e.g., common messages), and a third set of the fields may be applicable to TB-2 (e.g., private messages).

In some implementations, regular occasion messages and private messages may have the same parameters, which may allow a reduction in DCI size compared to the previous example. For example, the DCI 1100 may include a first set of fields applicable to TB-0 and TB-2, and a second set of fields applicable to TB-1. In some implementations, the SPS configuration 910 or an indicator at L1/L2/L3 may indicate whether regular occasion messages and private messages have the same transmission parameters. In another aspect, a size of the DCI 1100 may be signaled, and which fields are applicable to which types of TB may be implied from the size of the DCI 1100.

In an aspect, rate-splitting may be applicable to larger groups of UEs and/or changing groups of UEs. Further, channel conditions for each UE may change over time. In some implementations, the SPS configuration 910 may indicate a set of transmission parameters associated with each PDSCH occasion 730 (e.g., by expanding bitmap 914 to use multiple bits for each PDSCH occasion 730).

Figure 12:
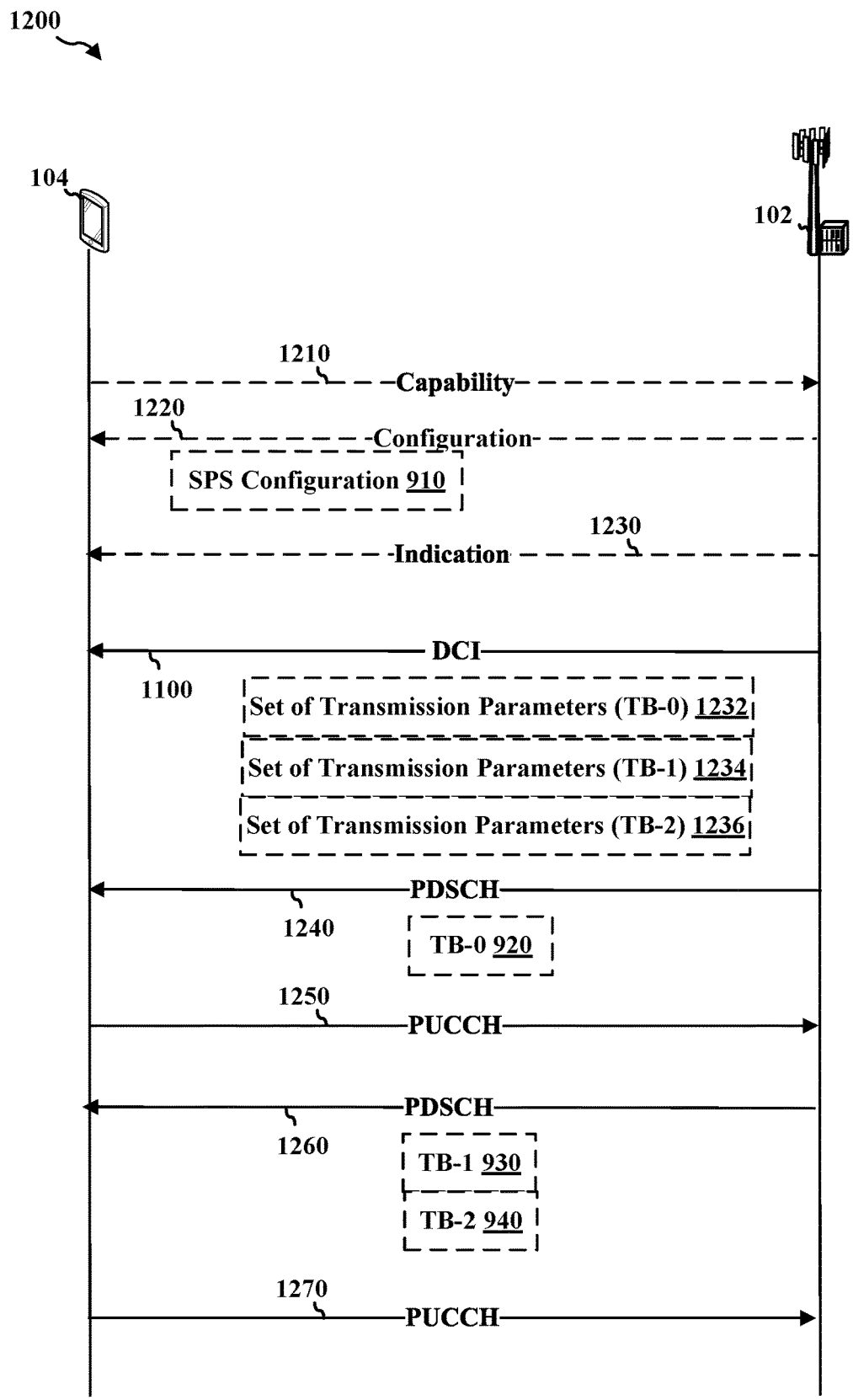
FIG. 12 is a message diagram illustrating example messages between a base station and a UE.

FIG. 12 is a message diagram 1200 illustrating example messages between a base station 102 and a UE 104. The UE 104 may be an example of a UE 104 including the multi-TB decoder component 140. The base station 102 may include the multi-TB transmitter component 120.

In some implementations, the UE 104 may optionally transmit a capability message 1210 to the base station 102.

For example, the capability message 1210 may be a RRC message. The capability message 1210 may indicate, for example, that the UE 104 is capable of decoding using rate-splitting.

The base station 102 may transmit a configuration 1220. The configuration 1220 may be, for example, an RRC message. For example, the configuration 1220 may include the SPS configuration 910.

In some implementations, the base station 102 may optionally transmit an indication 1230. The indication 1230 may provide additional information about the SPS configuration 910 or a DCI for multiple TBs. The indication 1230 may be an RRC message or a MAC-CE. For example, the indication 1230 may indicate a difference between first transmission parameters for a first type of TB and second transmission parameters for a second type of TB or third transmission parameters for a third type of TB. As another example, the indication 1230 may indicate a size of a DCI (e.g., DCI 1100). The indication 1230 may further indicate one or more of the second transmission parameters or the third transmission parameters that are different than the first transmission parameters.

The base station 102 may transmit the DCI 1100 to activate the SPS configuration 910. The DCI 1100 may include a set of first transmission parameters 1232, a set of second transmission parameters 1234, and a set of third transmission parameters 1236.

The base station 102 may transmit a PDSCH 1240 on a PDSCH occasion 730. For example, the PDSCH 1240 may carry a TB 920 of the first type. The UE 104 may decode the TB 920 using regular decoding procedures and the set of first transmission parameters 1232. The UE 104 may acknowledge the PDSCH 1240 by transmitting a PUCCH 1250.

The base station 102 may transmit a PDSCH 1260 on another PDSCH occasion 730. For example, the PDSCH 1260 may carry a TB 940 of a second type and a TB 950 of a third type. The UE 104 may decode the TB 940 and the TB 950 using the rate-splitting decoding procedure 600 with the set of second transmission parameters 1234 and the set of third transmission parameters 1236. The UE 104 may acknowledge the PDSCH 1260 by transmitting a PUCCH 1270.

The base station 102 may continue to transmit PDSCH according to the pattern indicated by the bitmap 914. In some implementation, the base station 102 may transmit a reactivation DCI 820 to update any of the transmission parameters 1232, 1234, 1236. The base station 102 may transmit an SPS release DCI 830 to stop the SPS configuration 910.

Figure 13:
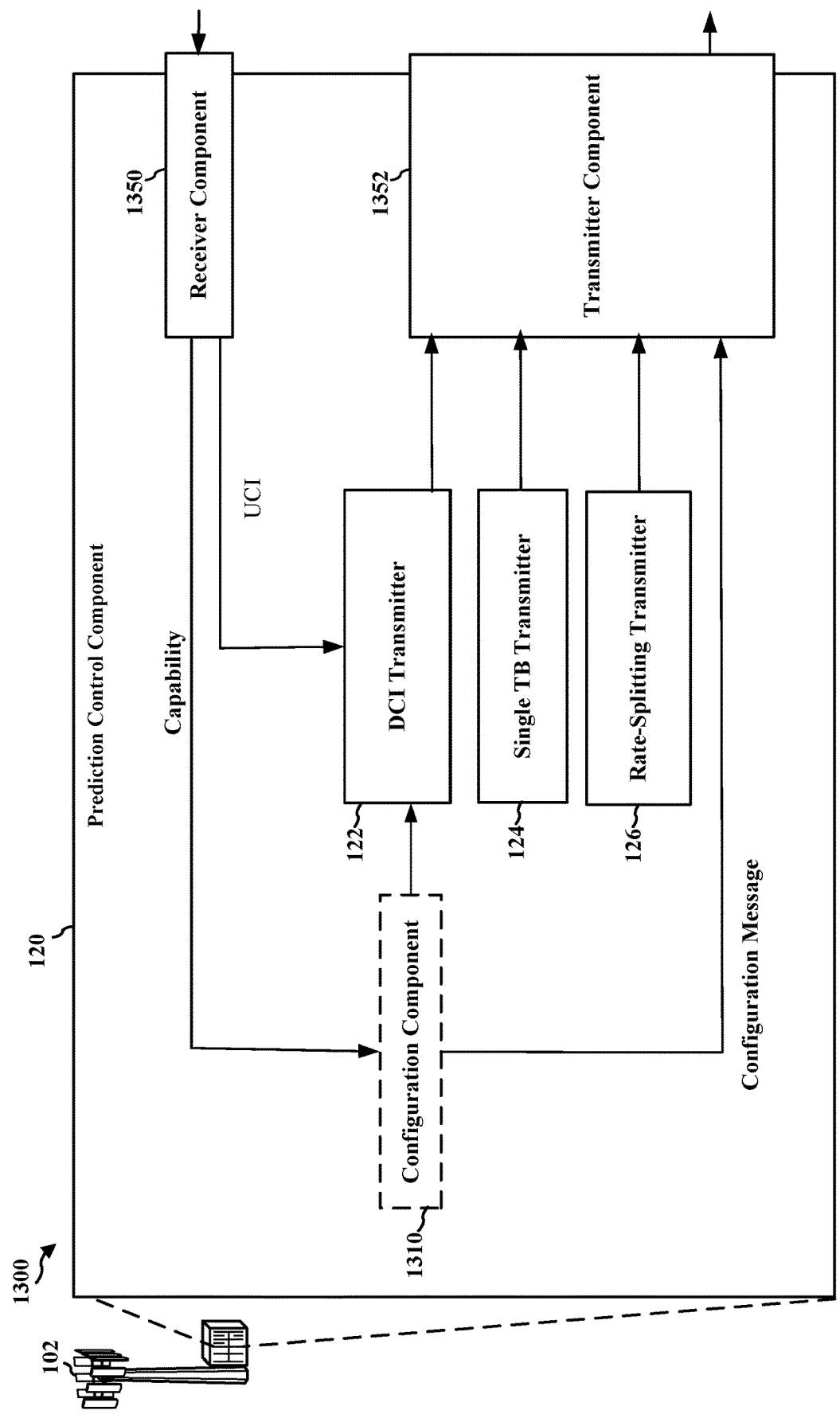
FIG. 13 is a conceptual data flow diagram illustrating the data flow between different means/components in an example base station.

FIG. 13 is a conceptual data flow diagram 1300 illustrating the data flow between different means/components in an example base station 102, which may be an example of the base station 102 including the multi-TB transmitter component 120. The multi-TB transmitter component 120 may be implemented by the memory 376 and the Tx processor 316, the Rx processor 370, and/or the controller/processor 375 of FIG. 3. For example, the memory 376 may store executable instructions defining the multi-TB transmitter component 120 and the Tx processor 316, the Rx processor 370, and/or the controller/processor 375 may execute the instructions.

The base station 102 may include a receiver component 1350, which may include, for example, a radio frequency (RF) receiver for receiving the signals described herein. The base station 102 may include a transmitter component 1352, which may include, for example, an RF transmitter for transmitting the signals described herein. In an aspect, the receiver component 1350 and the transmitter component 1352 may co-located in a transceiver such as illustrated by the Tx/Rx 318 in FIG. 3.

As discussed with respect to FIG. 1, the multi-TB transmitter component 120 may include the DCI transmitter 122, the single TB transmitter 124, and the rate-splitting transmitter 126. In some implementations, the multi-TB transmitter component 120 may include a configuration component 1310.

The receiver component 1350 may receive UL signals from the UE 104 including the capability message 1210 or the PUCCH 1250 or 1270. The receiver component 1350 may provide the capability message 1210 to the configuration component 1310. The receiver component 1350 may provide the PUCCH to the DCI transmitter 122.

The configuration component 1310 may be configured to transmit a configuration of a plurality of PDSCH occasions including the first PDSCH occasion and the second PDSCH occasion. For example, the configuration component 1310 may generate the SPS configuration 910. For instance, the configuration component 1310 may determine the SPS configuration for a UE 104 based on downlink scheduling for the UE 104. In particular, if the UE 104 is configured to receive a stream of data packets, the configuration component 1310 may generate the SPS configuration 910 to periodically deliver the data packets. In some implementations, the first PDSCH occasion is for a first type of TB (e.g., regular TB) and the second PDSCH occasion is for rate-splitting with a second type of TB and a third type of TB. Accordingly, the configuration of the second PDSCH occasion may also be based on downlink scheduling for at least a second UE. That is, the configuration component 1310 may identify time periods when both the first UE and the second UE are to receive data packets, and schedule the second transmission occasions to use rate-splitting during those periods. The configuration component 1310 may output a configuration message to the transmitter component 1352 for transmission, for example, as an RRC configuration message.

The DCI transmitter 122 may be configured transmit a DCI (e.g., activation DCI 720) that indicates at least first transmission parameters for a first type of transport block for the UE and second transmission parameters for a second type of transport block for rate-splitting with a second UE. For example, the DCI transmitter 122 may receive the configuration of the PDCCH occasions from the configuration component 1310. The DCI transmitter 122 may receive uplink control information (UCI), which may include, for example, HARQ feedback, precoding matrix indicator (PMI), channel quality indicator (CQI), rank indicator (RI), and/or layer indicator (LI). The DCI transmitter 122 may determine transmission parameters for TB s based on the SPS configuration and UCI. For instance, the DCI transmitter 122 may adapt the transmission parameters to current channel conditions. The DCI transmitter 122 may output the DCI 720 for transmission via the transmitter component 1352.

The single TB transmitter 124 may be configured to transmit the first type of first transport block during a first PDSCH occasion 730 based on the first transmission parameters. The single TB transmitter 124 may receive the first transmission parameters from the DCI transmitter 122. The single TB transmitter 124 may receive the data for transmission from a higher layer data source. The single TB transmitter 124 may encode the data for transmission according to the first transmission parameters. The single TB transmitter 124 may output a transport block for transmission via the transmitter component 1352.

The rate-splitting transmitter 126 may be configured to transmit the second type of transport block based on the second transmission parameters and a third type of transport block based on third transmission parameters during a second PDSCH occasion 730. The rate-splitting transmitter 126 may receive the second transmission parameters and the third transmission parameters from the DCI transmitter 122. The rate-splitting transmitter 126 may receive the data for transmission from a higher layer data source. The rate-splitting transmitter 126 may transmit message $W_1$ to the first UE and a message $W_2$ to the second UE as discussed above with respect to FIG. 5. The rate-splitting transmitter 126 may output the encoded transport blocks (e.g., X) for transmission via the transmitter component 1352.

Figure 16:
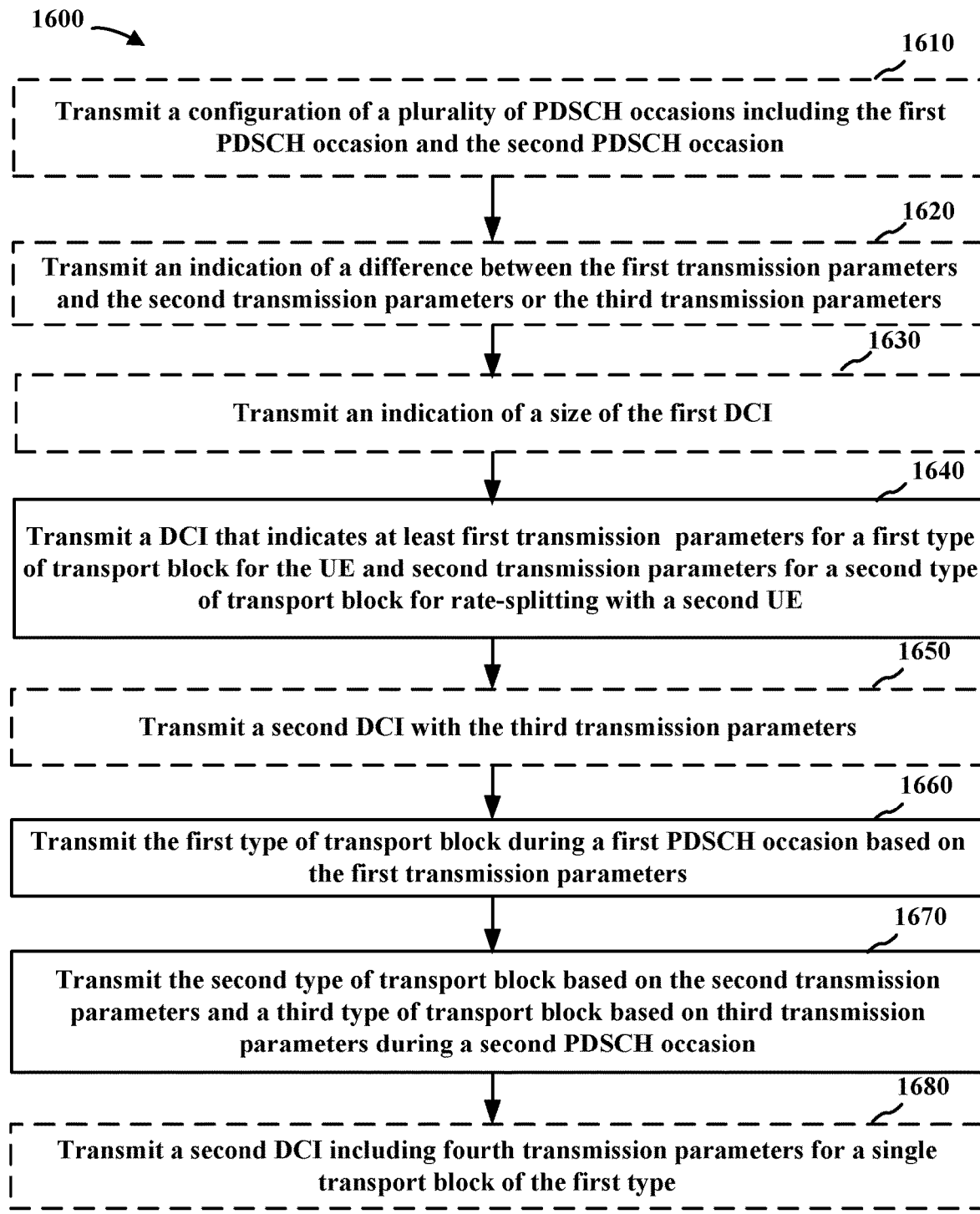
FIG. 16 is a flowchart of an example method for a base station to transmit different types of transport blocks.

Various components of base station 102 may provide means for performing the methods described herein, including with respect to FIG. 16. In some examples, means for transmitting, outputting, or sending (or means for outputting for transmission) may include the transceivers 318TX and/or antenna(s) 320 of the base station 102 illustrated in FIG. 3 and/or the transmitter component 1352 of the base station 102 in FIG. 13. Means for configuring or indicating may include the controller/processor 375, memory 376, and other various processors of FIG. 3 and/or the various components of FIG. 13 discussed above.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 3. Notably, FIG. 13 is an example, and many other examples and configurations of the base station 102 are possible.

Figure 14:
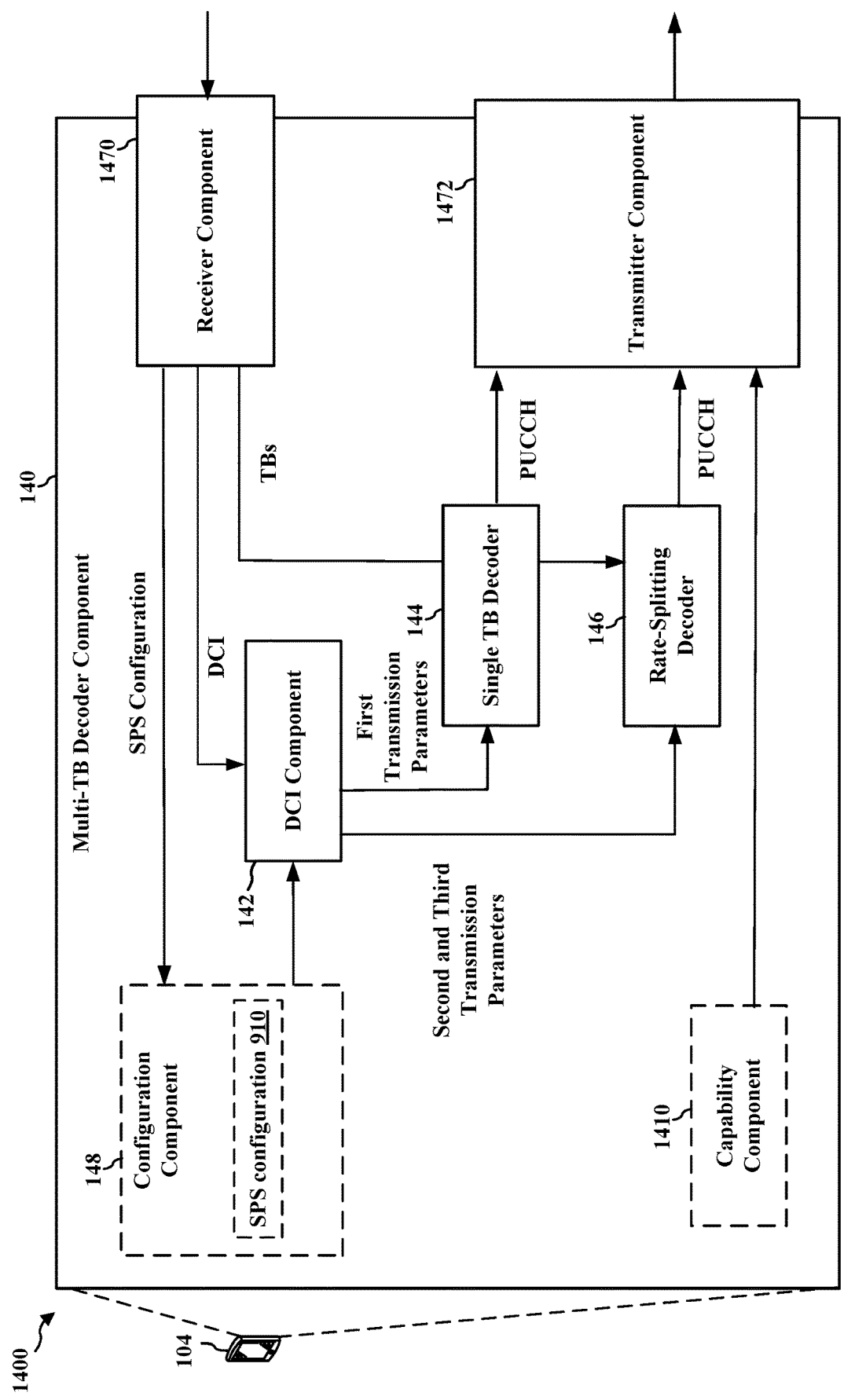
FIG. 14 is a conceptual data flow diagram illustrating the data flow between different means/components in an example UE.

FIG. 14 is a conceptual data flow diagram 1400 illustrating the data flow between different means/components in an example UE 104, which may include the multi-TB decoder component 140. The multi-TB decoder component 140 may be implemented by the memory 360 and the Tx processor 368, the Rx processor 356, and/or the controller/processor 359. For example, the memory 360 may store executable instructions defining the multi-TB decoder component 140 and the Tx processor 368, the Rx processor 356, and/or the controller/processor 359 may execute the instructions.

The UE 104 may include a receiver component 1470, which may include, for example, a RF receiver for receiving the signals described herein. The UE 104 may include a transmitter component 1472, which may include, for example, an RF transmitter for transmitting the signals described herein. In an aspect, the receiver component 1470 and the transmitter component 1472 may co-located in a transceiver such as the Tx/Rx 352 in FIG. 3.

As discussed with respect to FIG. 1, the multi-TB decoder component 140 may include the DCI component 142, the single TB decoder 144, and the rate-splitting decoder 146. In some implementations, the multi-TB decoder component 140 may optionally include a capability component 1410 and the configuration component 148.

The receiver component 1470 may receive DL signals described herein such as the configuration 1220, the indication 1230, the DCI 1100, the PDSCH 1240, and the PDSCH 1260. The receiver component 1470 may provide the configuration 1220 or the indication 1230 to the configuration component 148. The receiver component 1470 may provide the DCI 1100 to the DCI component 142. The receiver component 1470 may provide the PDSCH 1240 (or single TB carried thereon) to the single TB decoder 144. The receiver component 1470 may provide PDSCH 1260 (or the TBs carried thereon) to the rate-splitting decoder 146.

The configuration component 148 may be configured to receive a configuration of a plurality of PDSCH occasions including the first PDSCH occasion and the second PDSCH occasion. For example, the configuration component 148 may receive the configuration via the receiver component 1470 (and/or via the single TB decoder 144 or rate-splitting decoder 146 decoding an RRC message). In some implementations, the configuration is the SPS configuration 910 including the bitmap 914 indicating different types of PDSCH occasions. The configuration component 148 may provide the SPS configuration including the type of TB associated with each PDSCH occasion to the DCI component 142.

The DCI component 142 may be configured to receive a DCI 1100 that indicates at least first transmission parameters for a first type of transport block for the UE and second transmission parameters for a second type of transport block for rate-splitting with a second UE. For example, the DCI 1100 may include the first transmission parameters 1232 and the second transmission parameters 1234. In some implementations, the DCI 1100 may further include the third transmission parameters 1236. In some implementations, the DCI 1100 may include a difference between two sets of the transmission parameters or other indication of how to determine a transmission parameter set. The DCI 1100 may activate or re-active the SPS configuration. The DCI component 142 may determine the first transmission parameters, the second transmission parameters, and/or the third transmission parameters for each PDSCH occasion 730 based on the SPS configuration and the DCI 1100. The DCI component 142 may output the first transmission parameters, the second transmission parameters, and/or the third transmission parameters to the single TB decoder 144 and/or the rate-splitting decoder 146.

The single TB decoder 144 may be configured to receive the first type of transport block during a first PDSCH occasion based on the first transmission parameters. For example, the single TB decoder 144 may receive the first transmission parameters 1232 from the DCI component 142. The single TB decoder 144 may receive a TB received on PDSCH from the receiver component 1470. The single TB decoder 144 may decode the TB based on the first transmission parameters. The single TB decoder 144 may output a HARQ ACK/NACK on PUCCH based on whether the decoding is successful with a timing based on the SPS configuration or DCI 1100 (e.g., the parameter K1 714).

The rate-splitting decoder 146 may be configured to receive the second type of transport block based on the second transmission parameters and a third type of transport block based on third transmission parameters during a second PDSCH occasion. For example, the rate-splitting decoder 146 may be configured to perform the decoding procedure 600 discussed above with respect to FIG. 6. For instance, the rate-splitting decoder 146 may receive the second transmission parameters and the third transmission parameters from the DCI component 142. The rate-splitting decoder 146 may receive the TBs from the receiver component 1470. For instance, the received signal may include both the second TB and the third TB. The rate-splitting decoder 146 may first decode the second TB (e.g., $W_c$), then cancel the second TB from the received signal before decoding the third TB (e.g., $W_{1,p}$). In some implementations, the rate-splitting decoder 146 may combine the third TB with a portion of the second TB for the UE. The rate-splitting decoder 146 may output a HARQ ACK/NACK on PUCCH based on whether the decoding is successful with a timing based on the SPS configuration or DCI 1100 (e.g., the parameter K1 714).

In some implementations, the capability component 1410 may be configured to output for transmission an indication of a capability of the UE to perform rate splitting. For example, the capability component 1410 may output an RRC capability message 1210 via the transmitter component 1472.

Figure 15:
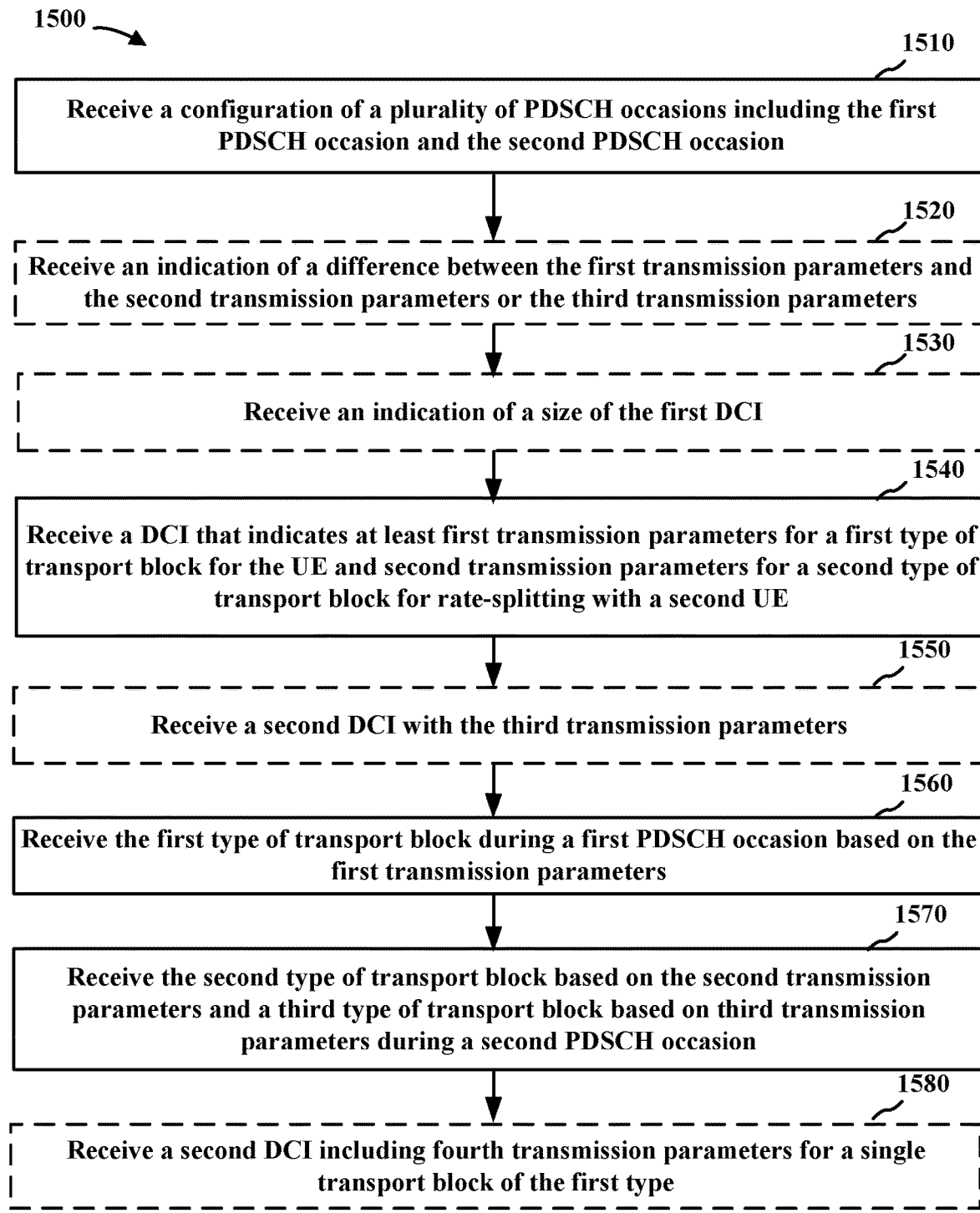
FIG. 15 is a flowchart of an example method for a UE to receive different types of transport blocks.

Various components of base station 102 may provide means for performing the methods described herein, including with respect to FIG. 15. In some examples, means for transmitting, outputting, or sending (or means for outputting for transmission) may include the transceivers 354TX and/or antenna(s) 352 of the UE 104 illustrated in FIG. 3 and/or the transmitter component 1472 of the UE 104 in FIG. 14. Means for receiving may include the controller/processor 359, memory 360, and other various processors of FIG. 3 and/or the various components of FIG. 14 discussed above.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 3. Notably, FIG. 14 is an example, and many other examples and configurations of the UE 104 are possible.

FIG. 15 is a flowchart of an example method 1500 for a UE 104 to receive different types of transport blocks. The method 1500 may be performed by a UE 104 (such as the UE 104, which may include the memory 360 and which may be the entire UE 104 or a component of the UE 104 such as the multi-TB decoder component 140, Tx processor 368, the Rx processor 356, or the controller/processor 359). The method 1500 may be performed by the multi-TB decoder component 140 in communication with the multi-TB transmitter component 120 of the base station 102. Optional blocks are shown with dashed lines.

At block 1510, the method 1500 may optionally include receiving a configuration of a plurality of PDSCH occasions including the first PDSCH occasion and the second PDSCH occasion. In some implementations, for example, the UE 104, the Rx processor 356 or the controller/processor 359 may execute the multi-TB decoder component 140 or the configuration component 148 to receive a configuration 1220 of a plurality of PDSCH occasions 730 including the first PDSCH occasion and the second PDSCH occasion. Accordingly, the UE 104, the Rx processor 356, or the controller/processor 359 executing the multi-TB decoder component 140 or the configuration component 148 may provide means for receiving a configuration of a plurality of PDSCH occasions including the first PDSCH occasion and the second PDSCH occasion.

At block 1520, the method 1500 may optionally include receiving an indication of a difference between the first transmission parameters and the second transmission parameters or the third transmission parameters. In some implementations, for example, the UE 104, the Rx processor 356 or the controller/processor 359 may execute the multi-TB decoder component 140 or the configuration component 148 to receive an indication of a difference between the first transmission parameters and the second transmission parameters or the third transmission parameters. In some implementations, the configuration includes a bitmap 714 indicating whether each of the plurality of PDSCH occasions is for rate-splitting and a size 712 of the bitmap. In some implementations, the configuration 1220 is a SPS configuration 910. Accordingly, the UE 104, the Rx processor 356, or the controller/processor 359 executing the multi-TB decoder component 140 or the configuration component 148 may provide means for receiving an indication of a difference between the first transmission parameters and the second transmission parameters or the third transmission parameters.

At block 1530, the method 1500 may optionally include receiving an indication of a size of the first DCI. In some implementations, for example, the UE 104, the Rx processor 356 or the controller/processor 359 may execute the multi-TB decoder component 140 or the configuration component 148 to receive an indication of a size of the first DCI 1100. For example, the indication may be an RRC message or MAC-CE. In some implementations, the indication further indicates one or more of the second transmission parameters or the third transmission parameters that are different than the first transmission parameters. Accordingly, the UE 104, the Rx processor 356, or the controller/processor 359 executing the multi-TB decoder component 140 or the configuration component 148 may provide means for receiving an indication of a size of the first DCI.

At block 1540, the method 1500 includes receiving a DCI that indicates at least first transmission parameters for a first type of transport block for the UE and second transmission parameters for a second type of transport block for rate-splitting with a second UE. In some implementations, for example, the UE 104, the Rx processor 356 or the controller/processor 359 may execute the multi-TB decoder component 140 or the DCI component 142 to receive a DCI 1100 that indicates at least first transmission parameters 1232 (e.g., fields 1108, 1110, 1120, 1122, 1124, and 1136) for a first type of transport block for the UE and second transmission parameters 1234 (e.g., additional TB fields 1150) for a second type of transport block for rate-splitting with a second UE. In some implementations, the DCI 1100 includes the first transmission parameters and the second transmission parameters. In some implementations, the DCI further includes the third transmission parameters for the third type of transport block. In some implementations, the second transmission parameters or the third transmission parameters are based on the first transmission parameters. For example, the second transmission parameters or the third transmission parameters may be based on the difference received in block 1520. Accordingly, the UE 104, the Rx processor 356, or the controller/processor 359 executing the multi-TB decoder component 140 or the DCI component 142 may provide means for receiving a DCI that indicates at least first transmission parameters for a first type of transport block for the UE and second transmission parameters for a second type of transport block for rate-splitting with a second UE.

At block 1550, the method 1500 may optionally include receiving a second DCI with the third transmission parameters. In some implementations, for example, the UE 104, the Rx processor 356 or the controller/processor 359 may execute the multi-TB decoder component 140 or the configuration component 148 to receive a second DCI (e.g., second stage DCI 1014) with the third transmission parameters 1236. Accordingly, the UE 104, the Rx processor 356, or the controller/processor 359 executing the multi-TB decoder component 140 or the DCI component 142 may provide means for receiving a second DCI with the third transmission parameters.

At block 1560, the method 1500 includes receiving the first type of transport block during a first PDSCH occasion based on the first transmission parameters. In some implementations, for example, the UE 104, the Rx processor 356 or the controller/processor 359 may execute the multi-TB decoder component 140 or the single TB decoder 144 to receive the first type of transport block (e.g., TB-0) during a first PDSCH occasion 730 based on the first transmission parameters 1232. Accordingly, the UE 104, the Rx processor 356, or the controller/processor 359 executing the multi-TB decoder component 140 or the single TB decoder 144 may provide means for receiving the first type of transport block during a first PDSCH occasion based on the first transmission parameters.

At block 1570, the method 1500 includes receiving the second type of transport block based on the second transmission parameters and a third type of transport block based on third transmission parameters during a second PDSCH occasion. In some implementations, for example, the UE 104, the Rx processor 356 or the controller/processor 359 may execute the multi-TB decoder component 140 or the rate-splitting decoder 146 to receive the second type of transport block (e.g., TB-1) based on the second transmission parameters 1234 and a third type of transport block (e.g., TB-2) based on third transmission parameters 1236 during a second PDSCH occasion 730. Accordingly, the UE 104, the Rx processor 356, or the controller/processor 359 executing the multi-TB decoder component 140 or the rate-splitting decoder 146 may provide means for receiving the second type of transport block based on the second transmission parameters and a third type of transport block based on third transmission parameters during a second PDSCH occasion.

At block 1580, the method 1500 may optionally include receiving a second DCI including fourth transmission parameters for a single transport block of the first type. In some implementations, for example, the UE 104, the Rx processor 356 or the controller/processor 359 may execute the multi-TB decoder component 140 or the DCI component 142 to receive a second DCI including fourth transmission parameters for a single transport block of the first type. In some implementations, where the DCI format is used for signaling transmissions for multiple TBs, the second DCI may be the same size as the first DCI and the second DCI may be padded (e.g., with 0s) after the fourth transmission parameters. Accordingly, the UE 104, the Rx processor 356, or the controller/processor 359 executing the multi-TB decoder component 140 or the DCI component 142 may provide means for receiving a second DCI including fourth transmission parameters for a single transport block of the first type.

FIG. 16 is a flowchart of an example method 1600 for a base station to transmit different types of TBs. The method 1600 may be performed by a base station (such as the base station 102, which may include the memory 376 and which may be the entire base station 102 or a component of the base station 102 such as the multi-TB transmitter component 120, the Tx processor 316, the Rx processor 370, or the controller/processor 375). The method 1600 may be performed by the multi-TB transmitter component 120 in communication with the multi-TB decoder component 140 of the UE 104.

At block 1610, the method 1600 may optionally include transmitting a configuration of a plurality of PDSCH occasions including the first PDSCH occasion and the second PDSCH occasion. In some implementations, for example, the base station 102, the Tx processor 316, or the controller/processor 375 may execute the multi-TB transmitter component 120 or the configuration component 1310 to transmit a configuration of a plurality of PDSCH occasions 730 including the first PDSCH occasion and the second PDSCH occasion. Accordingly, the base station 102, the Tx processor 316, or the controller/processor 375 executing the multi-TB transmitter component 120 or the configuration component 1310 may provide means for transmitting a configuration of a plurality of PDSCH occasions including the first PDSCH occasion and the second PDSCH occasion.

At block 1620, the method 1600 may optionally include transmitting an indication of a difference between the first transmission parameters and the second transmission parameters or the third transmission parameters. In some implementations, for example, the base station 102, the Tx processor 316, or the controller/processor 375 may execute the multi-TB transmitter component 120 or the configuration component 1310 to transmit an indication of a difference between the first transmission parameters 1232 and the second transmission parameters 1234 or the third transmission parameters 1236. In some implementations, the configuration includes a bitmap 714 indicating whether each of the plurality of PDSCH occasions is for rate-splitting and a size 712 of the bitmap. In some implementations, the configuration 1220 is a SPS configuration 910. Accordingly, the base station 102, the Tx processor 316, or the controller/processor 375 executing the multi-TB transmitter component 120 or the configuration component 1310 may provide means for transmitting an indication of a difference between the first transmission parameters and the second transmission parameters or the third transmission parameters.

At block 1630, the method 1600 may optionally include transmitting an indication of a size of the first DCI. In some implementations, for example, the base station 102, the Tx processor 316, or the controller/processor 375 may execute the multi-TB transmitter component 120 or the configuration component 1310 to transmit an indication of a size of the first DCI 1100. For example, the indication may be an RRC message or MAC-CE. In some implementations, the indication further indicates one or more of the second transmission parameters or the third transmission parameters that are different than the first transmission parameters. Accordingly, the base station 102, the Tx processor 316, or the controller/processor 375 executing the multi-TB transmitter component 120 or the configuration component 1310 may provide means for transmitting an indication of a size of the first DCI.

At block 1640, the method 1600 includes transmitting a DCI that indicates at least first transmission parameters for a first type of transport block for the UE and second transmission parameters for a second type of transport block for rate-splitting with a second UE. In some implementations, for example, the base station 102, the Tx processor 316, or the controller/processor 375 may execute the multi-TB transmitter component 120 or the DCI transmitter 122 to transmit a DCI 1100 that indicates at least first transmission parameters 1232 for a first type of transport block (e.g., TB-0) for the UE 104*a* and second transmission parameters 1234 for a second type of transport block (e.g., TB-1) for rate-splitting with a second UE 104*b*. In some implementations, the DCI 1100 includes the first transmission parameters and the second transmission parameters. In some implementations, the DCI further includes the third transmission parameters for the third type of transport block. In some implementations, the second transmission parameters or the third transmission parameters are based on the first transmission parameters. For example, the second transmission parameters or the third transmission parameters may be based on the difference received in block 1520. Accordingly, the base station 102, the Tx processor 316, or the controller/processor 375 executing the multi-TB transmitter component 120 or the DCI transmitter 122 may provide means for a DCI that indicates at least first transmission parameters for a first type of transport block for the UE and second transmission parameters for a second type of transport block for rate-splitting with a second UE.

At block 1650, the method 1600 may optionally include transmitting a second DCI with the third transmission parameters. In some implementations, for example, the base station 102, the Tx processor 316, or the controller/processor 375 may execute the multi-TB transmitter component 120 or the DCI transmitter 122 to transmit a second DCI (e.g., second stage DCI 1014) with the third transmission parameters 1236. Accordingly, the base station 102, the Tx processor 316, or the controller/processor 375 executing the multi-TB transmitter component 120 or the DCI transmitter 122 may provide means for transmitting a second DCI with the third transmission parameters.

At block 1660, the method 1600 includes transmitting the first type of transport block during a first PDSCH occasion based on the first transmission parameters. In some implementations, for example, the base station 102, the Tx processor 316, or the controller/processor 375 may execute the multi-TB transmitter component 120 or the single TB transmitter 124 to transmit the first type of transport block 920 during a first PDSCH occasion 730 based on the first transmission parameters 1232. Accordingly, the base station 102, the Tx processor 316, or the controller/processor 375 executing the multi-TB transmitter component 120 or the single TB transmitter 124 may provide means for transmitting the first type of transport block during a first PDSCH occasion based on the first transmission parameters.

At block 1670, the method 1600 includes transmitting the second type of transport block based on the second transmission parameters and a third type of transport block based on third transmission parameters during a second PDSCH occasion. In some implementations, for example, the base station 102, the Tx processor 316, or the controller/processor 375 may execute the multi-TB transmitter component 120 or the rate-splitting transmitter 126 to transmit the second type of transport block 940 based on the second transmission parameters 1234 and a third type of transport block 950 based on third transmission parameters 1236 during a second PDSCH occasion 730. Accordingly, the base station 102, the Tx processor 316, or the controller/processor 375 executing the multi-TB transmitter component 120 or the rate-splitting transmitter 126 may provide means for transmitting the second type of transport block based on the second transmission parameters and a third type of transport block based on third transmission parameters during a second PDSCH occasion.

At block 1680, the method 1600 may optionally include transmitting a second DCI including fourth transmission parameters for a single transport block of the first type. In some implementations, for example, the base station 102, the Tx processor 316, or the controller/processor 375 may execute the multi-TB transmitter component 120 or the DCI transmitter 122 to transmit a second DCI including fourth transmission parameters for a single transport block of the first type. In some implementations, where the DCI format is used for signaling transmissions for multiple TBs, the second DCI may be the same size as the first DCI and the second DCI may be padded (e.g., with 0s) after the fourth transmission parameters. Accordingly, the base station 102, the Tx processor 316, or the controller/processor 375 executing the multi-TB transmitter component 120 or the DCI transmitter 122 may provide means for transmitting a second DCI including fourth transmission parameters for a single transport block of the first type.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

EXAMPLE ASPECTS

1. A method of wireless communication at a UE, comprising:
   receiving a downlink control information (DCI) that indicates at least first transmission parameters for a first type of transport block for the UE and second transmission parameters for a second type of transport block for rate-splitting with a second UE;
   receiving the first type of transport block during a first physical downlink shared channel (PDSCH) occasion based on the first transmission parameters; and
   receiving the second type of transport block based on the second transmission parameters and a third type of transport block based on third transmission parameters during a second PDSCH occasion.
2. The method of clause 1, further comprising receiving a configuration of a plurality of PDSCH occasions including the first PDSCH occasion and the second PDSCH occasion.
3. The method of clause 2, wherein the configuration includes a bitmap indicating whether each of the plurality of PDSCH occasions is for rate-splitting and a size of the bitmap.
4. The method of clause 2 or 3, wherein the configuration is a semi-persistent scheduling (SPS) configuration and the DCI is an activation DCI for the SPS configuration.
5. The method of clause 4, wherein the DCI includes a bitmap indicating whether each of the plurality of PDSCH occasions is for rate-splitting.
6. The method of any of clauses 1-5, wherein the DCI includes the first transmission parameters and the second transmission parameters.
7. The method of any if clauses 1-6, wherein the DCI further includes the third transmission parameters for the third type of transport block.
8. The method of any of clauses 1-7, wherein the second transmission parameters or the third transmission parameters are based on the first transmission parameters.
9. The method of clause 8, further comprising receiving an indication of a difference between the first transmission parameters and the second transmission parameters or the third transmission parameters.
10. The method of any of clauses 1-9, further comprising receiving an indication of a size of the first DCI.
11. The method of clause 10, wherein the indication further indicates one or more of the second transmission parameters or the third transmission parameters that are different than the first transmission parameters.
12. The method of any of clauses 1-11, further comprising receiving a second DCI including fourth transmission parameters for a single transport block of the first type, the second DCI is a same size as first DCI and the second DCI is padded after the fourth transmission parameters.

13. The method of any of clauses 1-11, further comprising receiving a second DCI with the third transmission parameters.

14. A method of wireless communication at a base station, comprising:
    transmitting a downlink control information (DCI) that indicates at least first transmission parameters for a first type of transport block for a first user equipment (UE) and second transmission parameters for a second type of transport block for rate-splitting with a second UE;
    transmitting the first type of first transport block during a first physical downlink shared channel (PDSCH) occasion based on the first transmission parameters; and
    transmitting the second type of transport block based on the second transmission parameters and a third type of transport block based on third transmission parameters during a second PDSCH occasion.

15. The method of clause 14, further comprising transmitting a configuration of a plurality of PDSCH occasions including the first PDSCH occasion and the second PDSCH occasion.

16. The method of clause 15, wherein the configuration includes a bitmap indicating whether each of the plurality of PDSCH occasions is for rate-splitting and a size of the bitmap.

17. The method of clause 15 or 16, wherein the configuration is a semi-persistent scheduling (SPS) configuration and the DCI is an activation DCI for the SPS configuration.

18. The method of clause 17, wherein the DCI includes a bitmap indicating whether each of the plurality of PDSCH occasions is for rate-splitting.

19. The method of any of clauses 14-18, wherein the DCI includes the first transmission parameters and the second transmission parameters.

20. The method of any of clauses 14-19, wherein the DCI further includes the third transmission parameters for the third type of transport block.

21. The method of any of clauses 14-20, wherein the second transmission parameters or the third transmission parameters are based on the first transmission parameters.

22. The method of clause 21, further comprising transmitting an indication of a difference between the first transmission parameters and the second transmission parameters or the third transmission parameters.

23. The method of any of clauses 14-22, further comprising transmitting an indication of a size of the first DCI.

24. The method of clause 23, wherein the indication further indicates one or more of the second transmission parameters or the third transmission parameters that are different than the first transmission parameters.

25. The method of any of clauses 14-24, further comprising transmitting a second DCI including fourth transmission parameters for a single transport block of the first type, wherein the second DCI is a same size as the first DCI and the second DCI is padded after the fourth transmission parameters.

26. The method of any of clauses 14-24, further comprising transmitting a second DCI with the third transmission parameters.

27. An apparatus for wireless communication, comprising: a memory storing computer-executable instructions; and a processor configured to execute the instructions and cause the apparatus to perform the method of any of clauses 1-13.

28. An apparatus for wireless communication, comprising: a memory storing computer-executable instructions; and a processor configured to execute the instructions and cause the apparatus to perform the method of any of clauses 14-26.

29. A user equipment (UE), comprising: a transceiver; a memory storing computer-executable instructions; and a processor configured to execute the instructions and cause the UE to perform the method of any of clauses 1-13.

30. A base station, comprising: a transceiver; a memory storing computer-executable instructions; and a processor configured to execute the instructions and cause the base station to perform the method of any of clauses 14-26.

31. An apparatus for wireless communications, comprising means for performing a method in accordance with any one of clauses 1-13.

32. An apparatus for wireless communications, comprising means for performing a method in accordance with any one of clauses 14-26.

33. A non-transitory computer-readable medium comprising instructions that, when executed by an apparatus, causes the apparatus to perform a method in accordance with any one of clauses 1-13.

34. A non-transitory computer-readable medium comprising instructions that, when executed by an apparatus, cause the apparatus to perform a method in accordance with any one of clauses 14-26.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication at a UE, comprising:
 receiving a configuration of a plurality of physical downlink shared channel (PDSCH) occasions including a first PDSCH occasion and a second PDSCH occasion, wherein the configuration includes a bitmap indicating whether each of the plurality of PDSCH occasions is for rate-splitting and a size of the bitmap;
 receiving a downlink control information (DCI) that indicates at least first transmission parameters for a first type of transport block for the UE and second transmission parameters for a second type of transport block for rate-splitting with a second UE;
 receiving the first type of transport block during the first PDSCH occasion based on the first transmission parameters; and
 receiving the second type of transport block based on the second transmission parameters and a third type of transport block based on third transmission parameters during the second PDSCH occasion.

2. The method of claim 1, wherein the configuration is a semi-persistent scheduling (SPS) configuration and the DCI is an activation DCI for the SPS configuration.

3. The method of claim 1, wherein the DCI includes the first transmission parameters and the second transmission parameters.

4. The method of claim 1, wherein the DCI further includes the third transmission parameters for the third type of transport block.

5. The method of claim 1, wherein the second transmission parameters or the third transmission parameters are based on the first transmission parameters.

6. The method of claim 5, further comprising receiving an indication of a difference between the first transmission parameters and the second transmission parameters or the third transmission parameters.

7. The method of claim 1, further comprising receiving an indication of a size of the first DCI.

8. The method of claim 7, wherein the indication further indicates one or more of the second transmission parameters or the third transmission parameters that are different than the first transmission parameters.

9. The method of claim 1, further comprising receiving a second DCI including fourth transmission parameters for a single transport block of the first type, the second DCI is a same size as first DCI and the second DCI is padded after the fourth transmission parameters.

10. The method of claim 1, further comprising receiving a second DCI with the third transmission parameters.

11. A method of wireless communication at a base station, comprising:
 transmitting a configuration of a plurality of physical downlink shared channel (PDSCH) occasions including a first PDSCH occasion and a second PDSCH occasion, wherein the configuration includes a bitmap indicating whether each of the plurality of PDSCH occasions is for rate-splitting and a size of the bitmap;
 transmitting a downlink control information (DCI) that indicates at least first transmission parameters for a first type of transport block for a first user equipment (UE) and second transmission parameters for a second type of transport block for rate-splitting with a second UE;
 transmitting the first type of first transport block during the first PDSCH occasion based on the first transmission parameters; and
 transmitting the second type of transport block based on the second transmission parameters and a third type of transport block based on third transmission parameters during the second PDSCH occasion.

12. The method of claim 11, wherein the configuration is a semi-persistent scheduling (SPS) configuration and the DCI is an activation DCI for the SPS configuration.

13. The method of claim 11, wherein the DCI includes the first transmission parameters and the second transmission parameters.

14. The method of claim 11, wherein the DCI further includes the third transmission parameters for the third type of transport block.

15. The method of claim 11, wherein the second transmission parameters or the third transmission parameters are based on the first transmission parameters.

16. The method of claim 15, further comprising transmitting an indication of a difference between the first transmission parameters and the second transmission parameters or the third transmission parameters.

17. The method of claim 11, further comprising transmitting an indication of a size of the first DCI.

18. The method of claim 17, wherein the indication further indicates one or more of the second transmission parameters or the third transmission parameters that are different than the first transmission parameters.

19. The method of claim 11, further comprising transmitting a second DCI including fourth transmission parameters for a single transport block of the first type, wherein the second DCI is a same size as the first DCI and the second DCI is padded after the fourth transmission parameters.

20. The method of claim 11, further comprising transmitting a second DCI with the third transmission parameters.

21. A user equipment (UE), comprising:
 a transceiver;
 a memory storing computer-executable instructions; and
 a processor configured to execute the instructions and cause the UE to:
  receive, via the transceiver, a configuration of a plurality of physical downlink shared channel (PDSCH) occasions including a first PDSCH occasion and a second PDSCH occasion, wherein the configuration includes a bitmap indicating whether each of the plurality of PDSCH occasions is for rate-splitting and a size of the bitmap;
  receive, via the transceiver, a downlink control information (DCI) that indicates at least first transmission parameters for a first type of transport block for the UE and second transmission parameters for a second type of transport block for rate-splitting with a second UE;
  receive, via the transceiver, the first type of transport block during the first PDSCH occasion based on the first transmission parameters; and
  receive, via the transceiver, the second type of transport block based on the second transmission parameters and a third type of transport block based on third transmission parameters during the second PDSCH occasion.

22. The UE of claim 21, wherein the DCI further includes the third transmission parameters for the third type of transport block.

23. A base station, comprising:
 a transceiver;

a memory storing computer-executable instructions; and
a processor configured to execute the instructions and cause the base station to:
   transmit a configuration of a plurality of physical downlink shared channel (PDSCH) occasions including a first PDSCH occasion and a second PDSCH occasion, wherein the configuration includes a bitmap indicating whether each of the plurality of PDSCH occasions is for rate-splitting and a size of the bitmap;
   transmit a downlink control information (DCI) that indicates at least first transmission parameters for a first type of transport block for a first user equipment (UE) and second transmission parameters for a second type of transport block for rate-splitting with a second UE;
   transmit the first type of first transport block during the first PDSCH occasion based on the first transmission parameters; and
   transmit the second type of transport block based on the second transmission parameters and a third type of transport block based on third transmission parameters during the second PDSCH occasion.

* * * * *